United States Patent [19]

Wang et al.

[11] Patent Number: 5,774,579
[45] Date of Patent: *Jun. 30, 1998

[54] BLOCK SELECTION SYSTEM IN WHICH OVERLAPPING BLOCKS ARE DECOMPOSED

[75] Inventors: Shin-Ywan Wang, Tustin, Calif.; Toshiaki Yagasaki, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 514,250

[22] Filed: Aug. 11, 1995

[51] Int. Cl.$^6$ ..................................................... G06K 9/34
[52] U.S. Cl. ........................................... 382/176; 382/180
[58] Field of Search ................................... 382/173, 176, 382/178, 180; 358/462

[56] References Cited

U.S. PATENT DOCUMENTS

| | | | |
|---|---|---|---|
| 4,183,013 | 1/1980 | Agrawala et al. | 340/146.3 |
| 4,903,311 | 2/1990 | Nakamura | 382/174 |
| 4,949,287 | 8/1990 | Yamaguchi et al. | 364/523 |
| 5,029,224 | 7/1991 | Fujisawa | 382/22 |
| 5,031,121 | 7/1991 | Iwai et al. | 364/523 |
| 5,073,962 | 12/1991 | Califano | 382/27 |
| 5,091,964 | 2/1992 | Shimomura | 382/9 |
| 5,228,097 | 7/1993 | Kumagai | 382/56 |
| 5,235,653 | 8/1993 | Nakano et al. | 382/61 |
| 5,237,624 | 8/1993 | Okamoto et al. | 382/22 |
| 5,283,840 | 2/1994 | Kitamura et al. | 382/16 |
| 5,287,275 | 2/1994 | Kimura | 364/419.01 |
| 5,307,454 | 4/1994 | Shin | 395/133 |
| 5,321,770 | 6/1994 | Huttenlocher et al. | 382/22 |
| 5,333,213 | 7/1994 | Koyama et al. | 382/61 |
| 5,335,290 | 8/1994 | Cullen et al. | 382/176 |
| 5,369,507 | 11/1994 | Tanaka et al. | 382/180 |
| 5,555,362 | 9/1996 | Yamashita et al. | 382/176 |
| 5,555,556 | 9/1996 | Ozaki | 382/176 |
| 5,588,072 | 12/1996 | Wang | 382/176 |

FOREIGN PATENT DOCUMENTS

| | | |
|---|---|---|
| 62-203280 | 9/1987 | Japan . |
| 62-204380 | 9/1987 | Japan . |

OTHER PUBLICATIONS

K. Fan, et al., "Page Segmentation And Identification For Intelligent Signal Processing", Signal Processing European Journal Devoted to the Methods and Applications of Signal Processing, vol. 45, No. 3, Sep. 1, 1995, pp. 329–346.

*Primary Examiner*—Yon J. Couso
*Attorney, Agent, or Firm*—Fitzpatrick, Cella, Harper & Scinto

[57] ABSTRACT

In an image processing system for processing image data which includes both text areas and non-text areas, a method for extracting image data by performing block selection to obtain circumscribing rectangles around each block of text type areas in the image data and around each block of non-text type areas in the image data, obtaining outline pairs for each text and non-text block, determining whether the circumscribing rectangles overlap, decomposing overlapped rectangles based on the outline pairs, extracting image data based on the circumscribing rectangles for non-overlapped rectangles and based on the decomposed rectangles for overlapped rectangles, and processing the extracted image data.

19 Claims, 26 Drawing Sheets

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:

(1) Purely capitalistic enterprises that exploit their workers for profit.

(2) Those where management and labor work closely together to maximize profits, but don't pay enough attention to the community (3) A company that both tries to make money but also seeks to fulfill its corporate responsibilities to society, but in a small scale way to a particular country or region.

(4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Fig 1: Mr. Hideharu Takemoto

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Ink-Jet Printer Market Share
Source: Computer Reseller News/Info Corp

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

Canon Information Systems, Inc.

Page 1

FIG. 1A

Canon

Canon Information Systems, Inc.
Technical Information Center Newsletter
Published by Joyce Peluso
April 27, 1992, Volume 2, No. 4-4

Canon Wants Mutually Rewarding Coexistence

Source: Fortune, 7/29/91

Ryuzaburo Kaku, Chairman of the Board of Canon, Inc. in his recent interview had the following to say about the corporate world. The world is divided into four types of companies:

(1) Purely capitalistic enterprises that exploit their workers for profit.
(2) Those where management and labor work closely together to maximize profits, but don't pay enough attention to the community
(3) A company that both tries to make money but also seeks to fulfill its corporate responsibilities to society, but in a small scale way to a particular country or region.
(4) A highly evolved type of company that contributes positively to world prosperity.

Canon is aspiring to be the fourth type of company. This is a company that is socially responsible and practices good corporate citizenship at home and overseas and that can be referred to as a true global corporation. We have a basic philosophy to achieve a mutually rewarding coexistence among employees, shareholders, customers and the communities in which we do business.

Ryuzaburo Kaku, Chairman of the Board of Canon, Inc. continued to say about the four types of companies. Canon Company ..This is a company practicing good corporate and civic policies, a company concerened about it's emplyoees and shareholders.

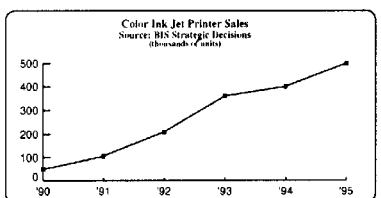

Fig 1: Mr. Hideharu Takemoto

Canon's Corporate Culture to Blend Best of U.S. & Japan

Source: Fortune, 8/26/91

Mr. Hideharu Takemoto, President of Canon U.S.A. was recently interviewed by Fortune Magazine and had the following to say about Canon in North America.

Mr. Takemoto wants to create a new Canon corporate culture, "The best of American and Japanese cultures must be blended to produce a richer corporate alchemy--a new ideal."

Canon wants to create more jobs for Americans in the 1990s and to make them an integral part of the Canon family. Mr. Takemoto is further committed to cultivating local talent and moving local executives up through the ranks of Canon's highest corporate echelons.

Canon Develops World's First Ferroelectric Liquid Crystal Display

Source: Wall Street Journal, 10/2/91,
Canon Press Release, 10/1/91

In a news conference yesterday, Hiroshi Tanaka, a Canon senior managing director said that the company has succeeded in developing the world's first ferroelectric liquid crystal (FLC) display screen. The screen will be test marketed next spring in Canon's EZPS Japanese language DTP system.

Ink-Jet Printer Market Share
Source: Computer Reseller News/Info Corp

| Selected Ink-Jet printers | March | April | May | June |
|---|---|---|---|---|
| Apple Stylewriter | 17.5% | 26.7% | 41.5% | 31.5% |
| H-P | | | | |
| PaintJet | <1% | 2% | <1% | <1% |
| DeskJet 500 | 49% | 39% | 31.6% | 24.6% |
| DeskWriter | 31% | 27.3% | 20.4% | 14.9% |
| Canon | | | | |
| BJ10E | <1% | 3.4% | 4.3% | 7.9% |
| BJ300/330 | <1% | <1% | <1% | <1% |

Canon Information Systems, Inc.                    Page 1

FIG. 2A

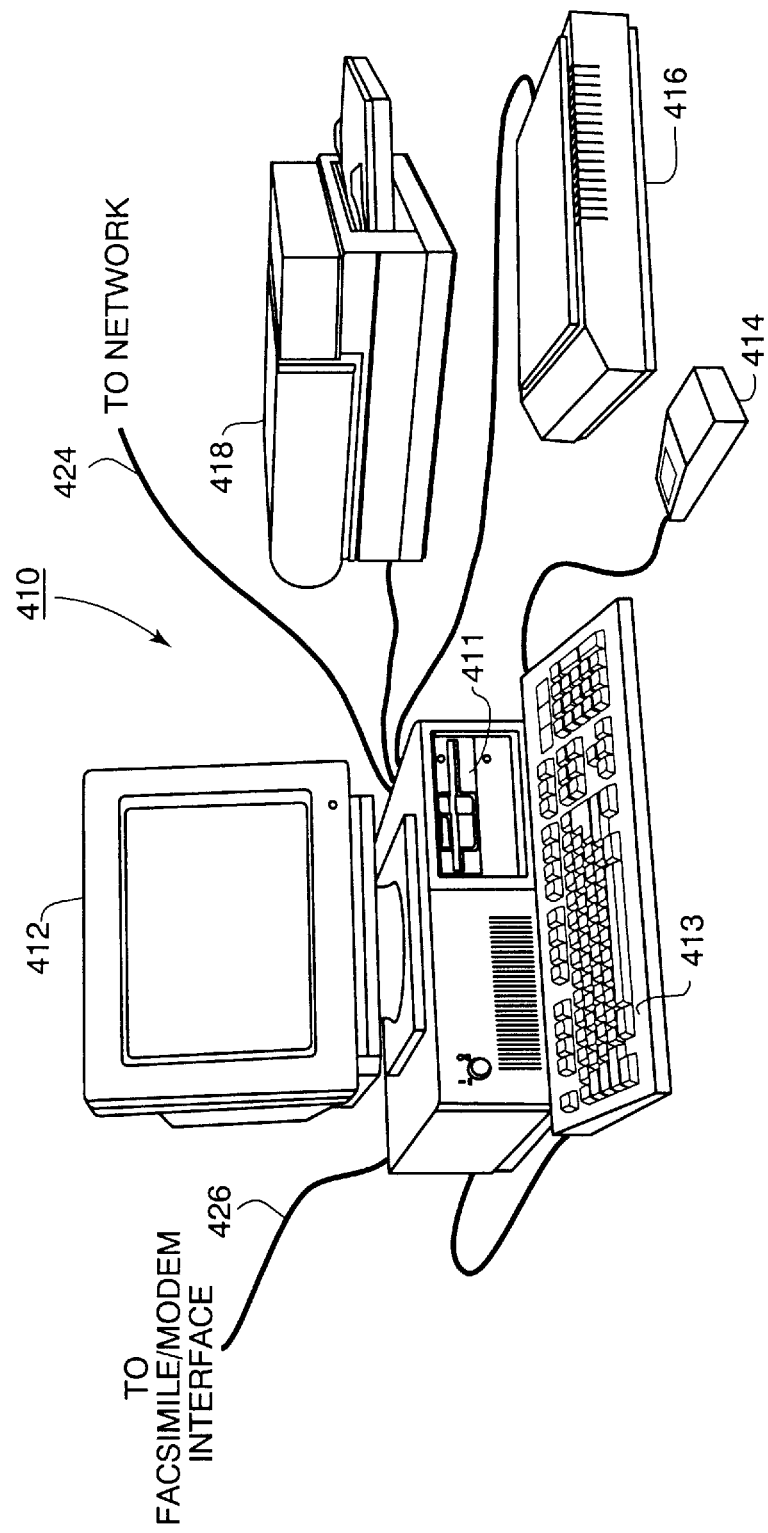

LEFT: ORIGINAL PICTURE.
RIGHT: PICTURE AFTER THE OUTLINE COMBINING AND
CONNECTING. THE THICKER EDGE INDICATES
THE NEW OUTLINE.

BLOCK SELECTION SYSTEM IN WHICH OVERLAPPING BLOCKS ARE DECOMPOSED

BACKGROUND OF THE INVENTION

1. Field Of The Invention

The present invention relates to a block selection (or, feature extraction) system which analyzes images of a document page in order to distinguish between text and non-text areas on the document page, which defines circumscribing rectangles around each group of text areas and around each group of non-text areas, and which thereafter identifies overlapping rectangles so as to permit removal of overlapping portions of those rectangles by decomposition thereof.

2. Description of the Related Art

In conventional feature extraction systems, different types of image data for a document page are first identified in accordance with whether the image data is text-type or non-text-type, and areas of the image data are then grouped (or, "blocked") together based on type. Each block of image data is subsequently extracted for further processing. Specifically, conventional feature extraction systems execute a block selection routine so as to identify connected components within the image data, to separate text from non-text type connected components, to separately group the text and non-text connected components preferably into rectangular blocks, and to subject the non-text connected components to further analysis so as to identify particular kinds of non-text connected components such as table data, graph data, line art images, halftone images, frames and the like.

Once features of the image data have been extracted, a hierarchical tree may be defined with each node of the tree being provided in one-for-one correspondence to each block-rectangular group of image data defined during block selection. At each node of the tree, attribute information is stored for each block-rectangular piece of image data. Specifically, the attribute information can include whether the block of image information is text-type or non-text-type, with text-type information further being classified into title regions, caption regions, text regions, etc., and with non-text-type information being further classified into table information, line art information, graph information, halftone image information, etc. In addition, the position of the node in the hierarchical tree implicitly stores the position of the corresponding block-rectangle of image information within the document page. Coupled with the location of the rectangular block within the image information for the document, the hierarchical tree permits extraction of each block of information for appropriate subsequent processing, such as optical character recognition (OCR), data and/or image compression, data routing, data extraction, storage, retrieval, etc. For example, blocks of image data which are designated as text data can be subjected to appropriate OCR processing, whereas blocks of image data which are designated as picture data could be subjected to data compression. As a result, image data for any of a variety of different document pages can arbitrarily be input and automatically processed appropriately without an operator's intervention.

For orderly processing of each block of image data, many conventional feature extraction systems depend on the assumption that the blocks do not overlap. Such an assumption is valid in the vast majority of documents, such as the document illustrated at FIG. 1A. As seen there, a representative document page 1 is arranged in a two-column format and includes title areas 2, a horizontal line 3, text areas 4, 5 and 6 which each include lines of text data, a halftone picture area 7, a framed area 8, and a table 9. According to the block selection techniques described in U.S. application No. 07/873,012, "Method And Apparatus For Character Recognition" now U.S. Pat. No. 5,680,479, and application No. 08/338,781, "Page Analysis System" now pending, each area of document page 1 is identified and designated in accordance with the type of image data located therein, and image data is then segmented based on its respective type. As a result of the block selection process, rectangular blocks for each of the image areas are created, as shown in FIG. 1B, and a corresponding hierarchical tree structure is formed. Specifically, as shown in FIG. 1B, for image data 11 corresponding to document 1, block selection defines various text-type areas such as title blocks 12 and text blocks 14, 15 and 16, as well as various non-text blocks such as line block 13, halftone image block 17, framed area 18, and table area 19.

As shown in FIG. 1B, none of the rectangular blocks overlaps another one of the blocks, although it is possible for some of the non-text blocks to include text blocks within them. For example, framed area 18 includes non-text line art area 18a and text area 18b, and table area 19 includes text-type table entries designated generally at 19a.

As mentioned above, based on the block-rectangular designation of image areas in image data 11, image data in each information area can be extracted for appropriate subsequent processing. Further, and as also mentioned above, extraction is straight-forward since none of the rectangular blocks overlaps with another.

Difficulties have arisen when the block-rectangular areas overlap with each other. Such an overlap can occur, for example, with simple change in an editor's style which can profoundly affect the overall appearance of a document. Thus, as shown in FIG. 2A, a simple change in editorial style has been effected in which framed area 8 has been moved to the position shown at 8a which straddles the two columns of the document. Conventional block selection and feature extraction techniques result in the block-rectangular format shown in FIG. 2B, in which it is seen that block 18a overlaps onto block 14 and onto block 15. When it comes time to extract image data based on the rectangular blocks so defined, the overlap of these blocks causes difficulties. Specifically, when it comes time to extract image data for block 14, which is assumed to correspond only to text image data of area 4, it is seen that an unwanted portion of the non-text framed area 18a will also be extracted. Likewise, when it comes time to extract image data for area 15, which is presumed to include only text-type image data, it is seen that another unwanted portion of non-text framed area 18a is extracted. Thus, overlap in block-rectangular areas defined by a feature extraction or block selection technique has heretofore caused difficulties.

SUMMARY OF THE INVENTION

The present invention addresses the foregoing difficulties by identifying overlapping rectangles which result from block selection and feature extraction processing, and by decomposing the overlapping rectangles into smaller non-overlapping rectangles. Preferably, not all overlapping rectangles are decomposed, but rather the overlapping rectangles are first analyzed to determine whether decomposition is needed so as to avoid extracting unwanted image data within a second rectangle when extracting image data for a first rectangle.

In a preferred form, decomposition of overlapping rectangles is based on outline pairs of image data within each rectangle. Specifically, for image data which spans many horizontal rows, a tight outline is defined, from which outline pairs can be obtained for each image row, the outline pairs defining the left-most and the right-most extremities of image data for that line. Outline pairs are obtained differently for each of three mutually exclusive different kinds of image data within circumscribing rectangles. Specifically, outline pairs are obtained differently for (1) text data, (2) non-text data which does not include any internal objects, and (3) non-text data which includes internal objects.

Overlapping rectangular blocks of image data are analyzed to determine whether the overlap interferes with proper image extraction. If the overlap does not interfere with proper image extraction, then decomposition is not performed and the outline pairs are not used. On the other hand, if overlap in the rectangular blocks is determined to interfere with proper image extraction, then the outline pairs are used to decompose the overlapped rectangles. Specifically, decomposition is carried out differently in accordance with the type of overlapping rectangles that are involved. That is, decomposition is carried out differently for (1) a text block that overlaps onto any other type (i.e., text or non-text) block, (2) a non-text block which does not include any internal contents and which overlaps onto any other type of block, and (3) a non-text block which includes internal contents and which overlaps onto any other type of block.

Thus, in one aspect of the invention an image processing method for processing image data which includes both text areas and non-text areas is provided. The method includes steps in which block selection is performed to obtain circumscribing rectangles around each block of text type areas in the image data and around each block of non-text type areas in the image data and outline pairs for each text and non-text block are obtained. It is then determined whether the circumscribing rectangles overlap. Overlapped rectangles based on the outline pairs are decomposed and image data based on the circumscribing rectangles for non-overlapped rectangles and based on the decomposed rectangles for overlapped rectangles is extracted. The extracted image data is then processed.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIGS. 1A and 2A are views of representative document pages.

FIG. 3 is a perspective view showing the outward appearance of an apparatus embodying the present invention;

DETAILED DESCRIPTION OF THE PREFERRED EMBODIMENT

Figure 1B:
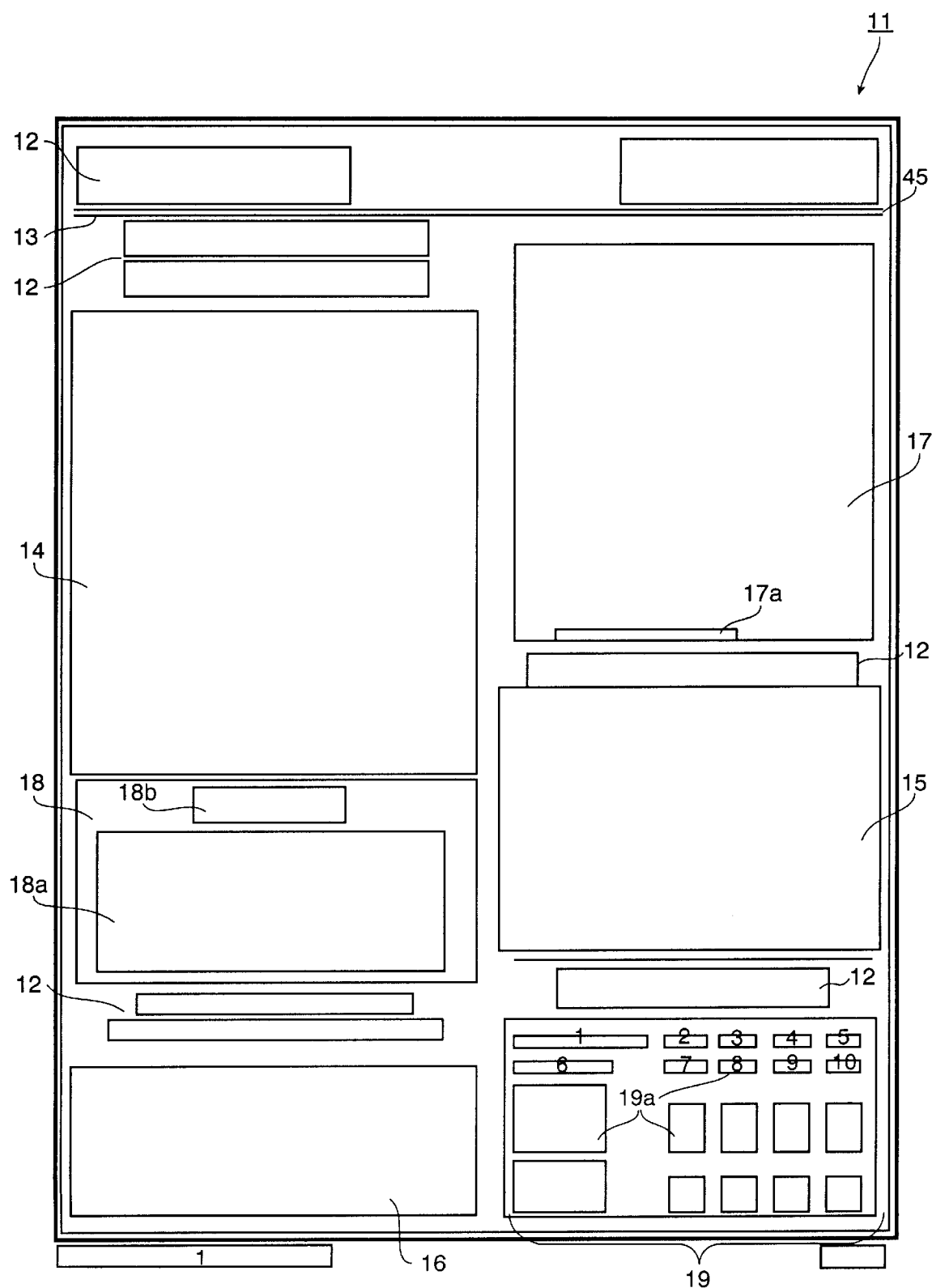
FIGS. 1B and 2B are views showing rectangular blocks obtained from block selection processing on FIGS. 1A and 2A, respectively.
Figure 2B:
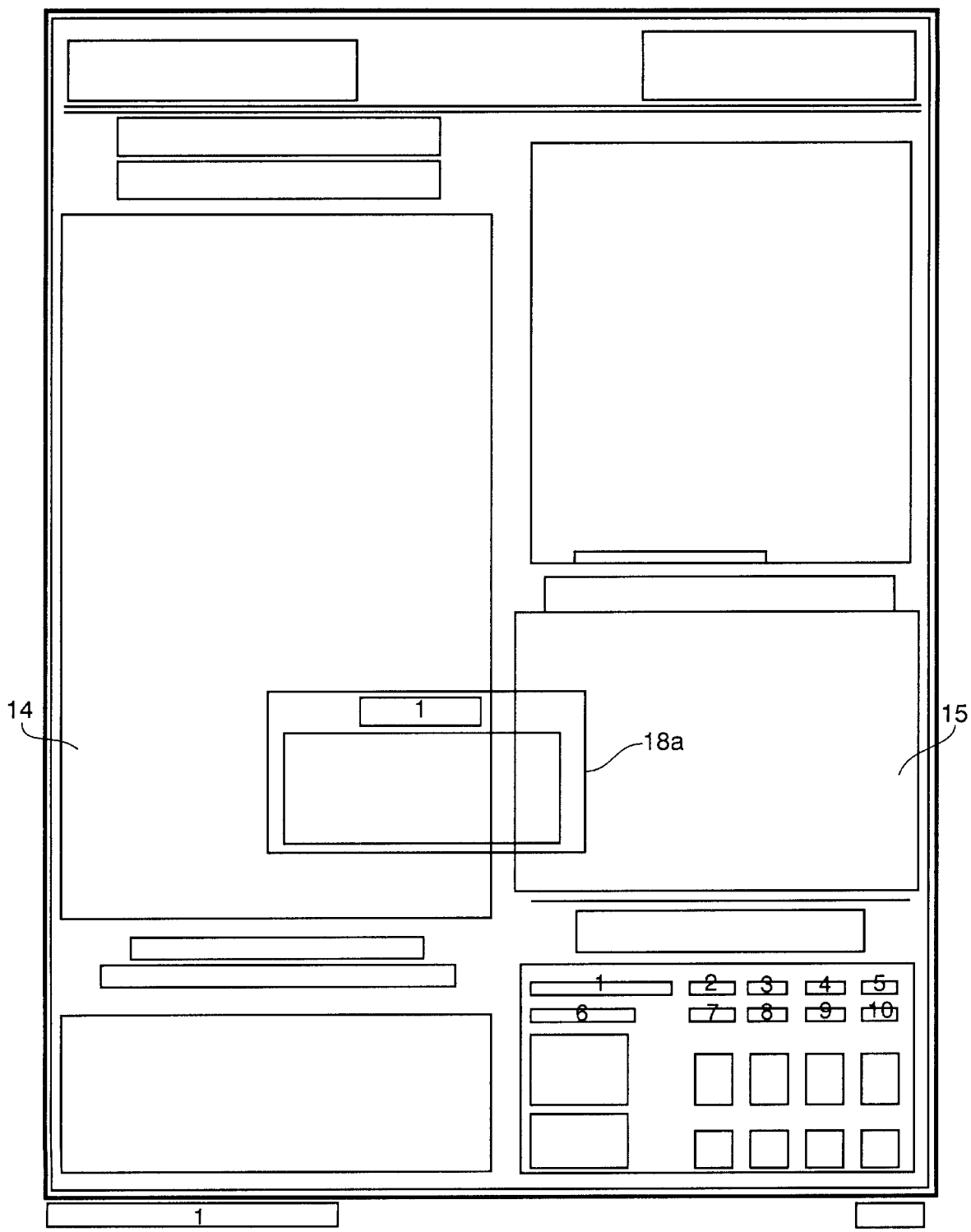

FIG. 3 is a view showing the outward appearance of a representative embodiment of the invention which incorporates overlapping rectangle analysis and decomposition according to the present invention. Although a programmed general purpose computer is shown in FIG. 3, it is to be understood that the invention can be embodied in other equipment, such as dedicated, stand-alone equipment like ROM-based or hardwired equipment that can be incorporated into other image processing equipment.

Shown in FIG. 3 is computing equipment 410 such as an IBM PC or PC-compatible computer having a windowing operating system such as Microsoft Windows operating system. Computing equipment 410 is provided with either a monochromatic or color display monitor 412, on which computing equipment 410 displays images to the user. Computing equipment 410 is further provided with fixed disk drive 411 for storing data files such as document image files and application program files such as block select and overlapping rectangle analysis and decomposition programs. Further provided in computing equipment 410 is keyboard 413 for permitting input of text data and manipulation of objects displayed in display screen 412, and pointing device 414, such as a mouse, which is provided for pointing and for manipulating objects displayed on display 412.

A multi-page document is input by scanner 416 which scans each page of the document or other document images, and provides bitmap image data of those pages to computing equipment 410. The image data is stored on 411 in either compressed or uncompressed format.

A conventional color printer 418 is provided for outputting documents processed by computing equipment 410.

Also provided are network interface 424 for interfacing with a local area network, and facsimile/modem interface 426 for sending and receiving facsimile messages and other data files via a facsimile/data modem. Such interfaces can be used in addition to, or in replacement of, scanner 416 for inputting document image data.

In accordance with operator instructions, and under control of the windowing operating system, stored application programs such as desktop publishing programs, drawing application programs and block selection programs are selectively activated to process and to manipulate data. Also in accordance with operator instructions and based on those stored application programs, commands are issued to display images on monitor 412 and to print images appearing on monitor 412 by printer 418.

Most typically, the application programs stored on computer disk 411, including the block selection program and overlapping rectangle analysis and decomposition programs which embody the present invention, have been stored on disk 411 by downloading each application from another computer-readable medium, such as a floppy diskette, a CD-ROM, or a computer bulletin board.

Figure 4:
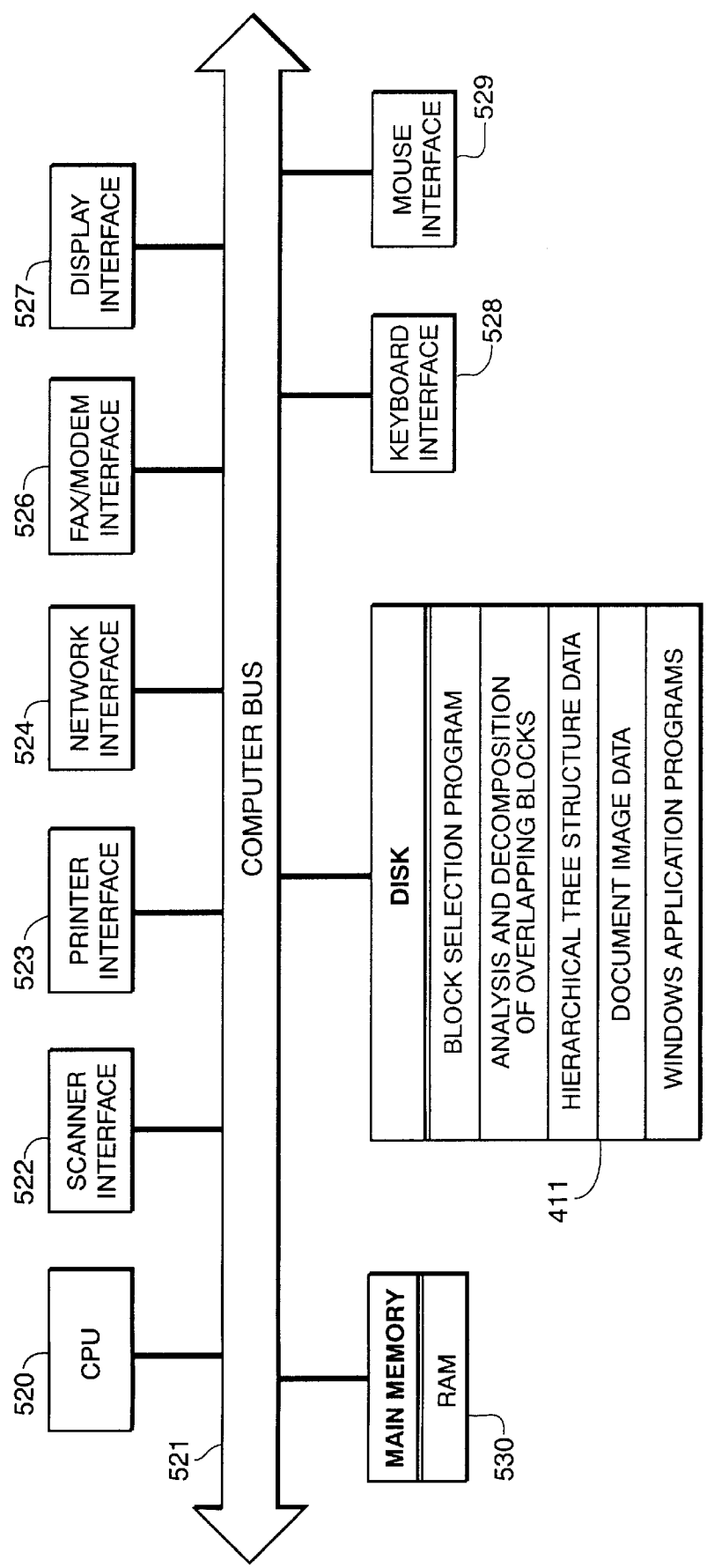
FIG. 4 is a block diagram of the FIG. 3 apparatus.

FIG. 4 is a detailed block diagram showing the internal construction of computing equipment 410. As shown in FIG. 4, computing equipment 410 includes a central processing unit (CPU) 520 such as a programmed microprocessor, interfaced to computer bus 521. Also interfaced to computer bus 521 is scanner interface 522, printer interface 523, network interface 524, facsimile/modem interface 526, display interface 527, keyboard interface 528, and mouse interface 529.

Main memory 530, such as random access memory (RAM), interfaces to computer bus 521 so as to provide CPU 520 with access to memory storage. In particular, when executing stored application program instruction sequences, such as those associated with application programs stored on disk 411, CPU 520 loads those instruction sequences from disk 411 (or other computer-readable media such as media accessed via network interface 524 or via an unshown floppy disk drive) into main memory 530 and executes those stored program instruction sequences out of the main memory 530.

Figure 5:
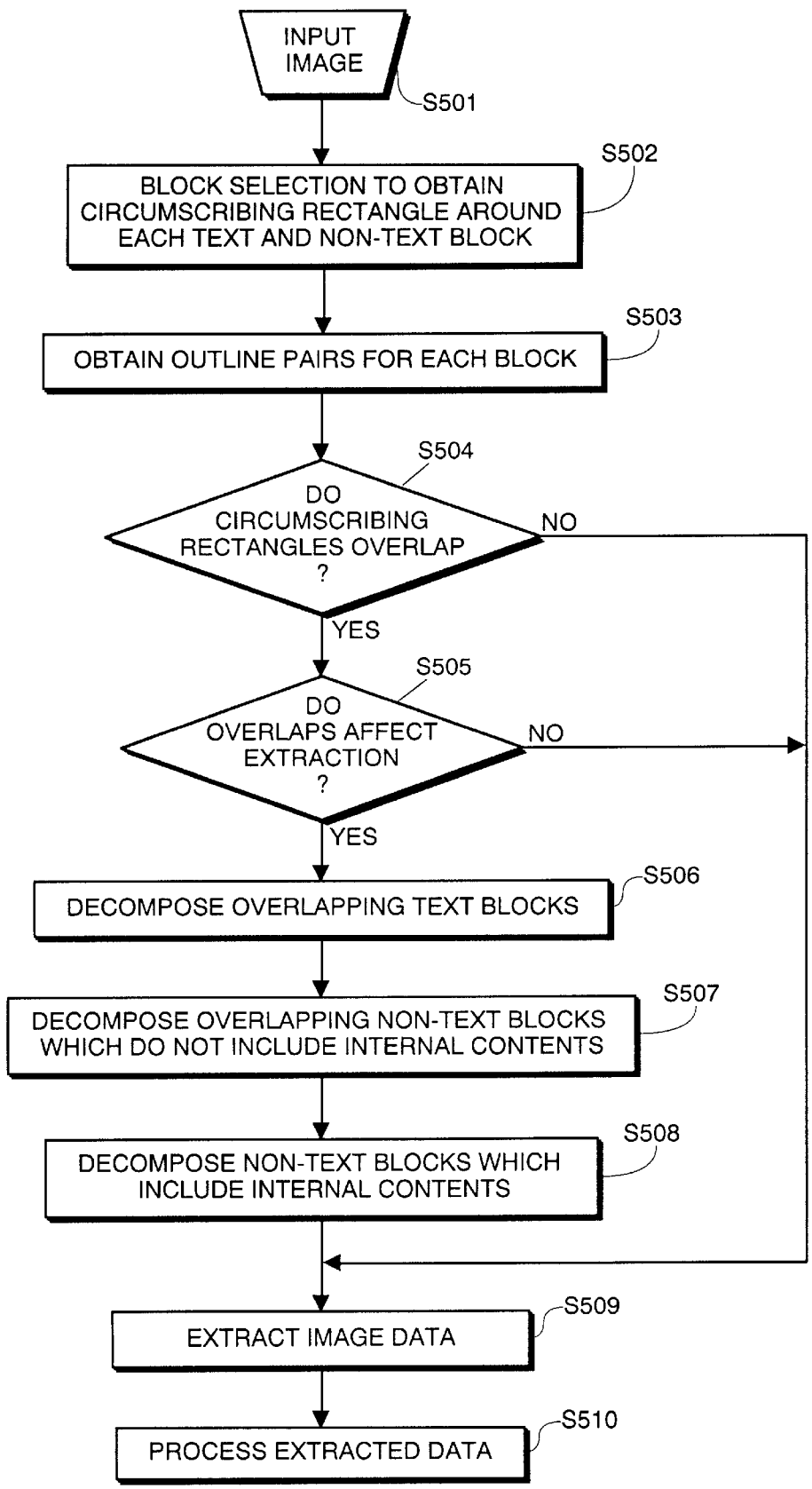
FIG. 5 is a flow diagram showing how overlapping rectangles are analyzed and decomposed.

FIG. 5 is a flow diagram showing a computer-implemented method by which an input image representing a document page is input, block selection is performed on the input image so as to define circumscribing rectangles around each text and non-text block in the document image, outline pairs are obtained for each block, the circumscribing rectangles are analyzed to determine whether they overlap, and if they overlap to determine whether or not the overlap affects image extraction, and overlapping rectangles are subsequently decomposed if it is determined that they affect image extraction. Specifically, and as shown in FIG. 5, decomposition is performed differently based on whether the overlapping rectangle circumscribes a text block, a non-text block which does not include any internal contents, or a non-text block which does include internal contents. The process steps shown in FIG. 5 are stored on computer readable media and, as mentioned above, executed by CPU 520 which loads those process steps into main memory 530 for execution therefrom.

Specifically, in step S501, image data representative of a document page is input. As mentioned previously, the image data may be input via scanner 416 or may be obtained from stored image data files such as on disk 11 or via network interface 424 or facsimile/modem interface 426.

In step S502, block selection is performed an the input image data so as to obtain circumscribing rectangles around each text and non-text block, as well as to obtain a hierarchical tree for storing attribute information and position information for each block. Suitable block selection techniques are described in the aforementioned application Nos. 07/873,012 and 08/388,781, the contents of which are incorporated herein by reference as if set forth in full.

In step S503, to the extent that outline pairs have not already been calculated during block selection in step S502, outline pairs are obtained for each block-rectangular area defined in step S502 by block selection. Specifically, each block ordinarily will span-multiple horizontal lines. For each such line spanned by the block, an outline pair defining the left-most and right-most area in the block is obtained in step S503. Outline pairs are obtained differently in dependence on the type of data within the rectangular block. Specifically, outline pairs are defined differently in dependence on whether the block is (1) a text block, (2) a non-text block which does not include internal contents, or (3) a non-text block which does include internal contents. How to obtain outline pairs in accordance with step S503 is explained in greater detail in connection with FIG. 6, described below.

Step S504 determines whether the circumscribing rectangles obtained in step S502 overlap. Determining whether the circumscribing rectangles overlap is explained below in more detail in connection with FIG. 10. If no circumscribing rectangles overlap, then no further processing in accordance with the invention need be performed, and flow skips to step S509.

On the other hand, if step S504 determines that circumscribing rectangles overlap, then step S505 determines whether the overlap affects image extraction. Generally speaking, while most overlaps will affect image extraction, it is possible for some overlaps to exist which do not affect image extraction. For example, it is possible for block selection to define two circumscribing rectangles which, although overlapping, are mutually exclusive in that a first circumscribing rectangle does not contain any image data for the second circumscribing rectangle and vice-versa. Such circumscribing rectangles, while overlapping, do not affect image extraction. Specifics on how to determine whether overlaps affect image extraction are discussed below in more detail in connection with FIGS. 11A through 11C.

If step S505 determines that overlaps do not affect image extraction, then no further processing in accordance with the invention need be done, and flow skips ahead to step S509. On the other hand, if overlaps affect image extraction, then flow advances to steps S506, S507 and S508, which each respectively decompose overlapping blocks so that they no longer affect image extraction.

Each of steps S506, S507 and S508 decompose overlapping blocks differently based on what kind of blocks overlap. Thus, step S506 decomposes text blocks that overlap on any other kind of block, that is, onto a text or a non-text block. Step S507 decomposes overlapping non-text blocks which do not include any internal contents. And, step S508 decomposes non-text blocks which include internal contents. The hierarchical tree is updated based on whatever decomposition is performed in steps S506, S507 or S508.

After decomposing overlapping text and non-text blocks in step S506 or S507 or S508, flow advances to step S509 in which image data is extracted in accordance with the circumscribing rectangles which define the image data. Thus, for example, in a situation in which no overlapping rectangles existed, image data is extracted in accordance with the circumscribing rectangles defined by block selection in step S502. On the other hand, in a case where overlapping rectangles existed and were decomposed in accordance with steps S506, S507 or S508, then image extraction for each block is carried out in accordance with the decomposed blocks determined in those steps.

Flow then advances to step S510 in which the extracted image data is processed appropriately. For example, as mentioned above, when extracting text-type image data, appropriate processing may be optical character recognition so as to determine the identity of character images in the text data. Likewise, appropriate processing for non-text table areas may include OCR processing for text included within the tables. As one further example, appropriate processing for non-text halftone image data may include simple image compression so as to permit storage of the halftone picture in a smaller storage area.

Processing of FIG. 5 is repeated, as needed, for image data of each document page for which block selection and image extraction is desired.

Figure 6A:
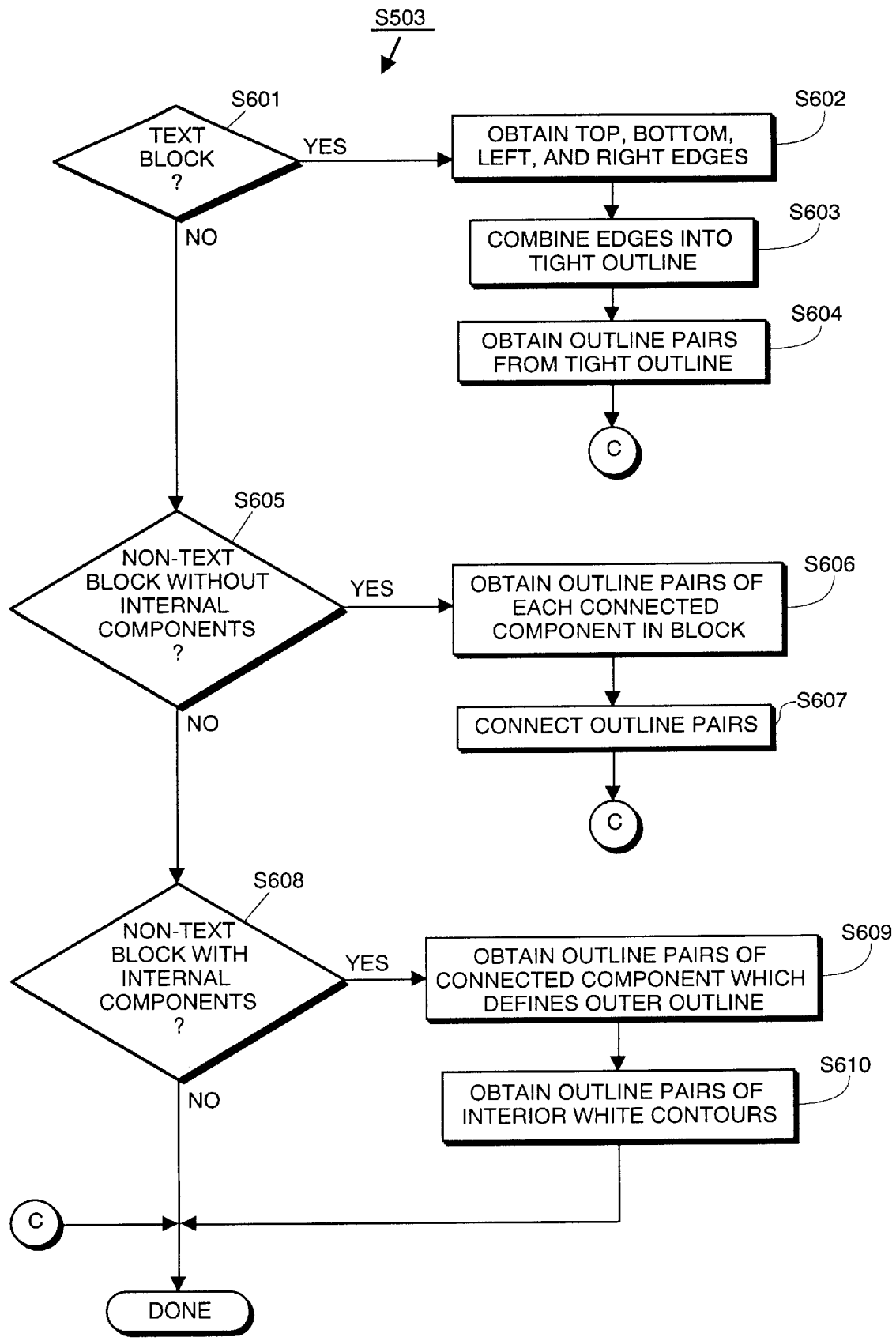
FIG. 6A is a flow diagram for explaining how to obtain outline pairs for image data within rectangular blocks of image data.
Figure 6B:
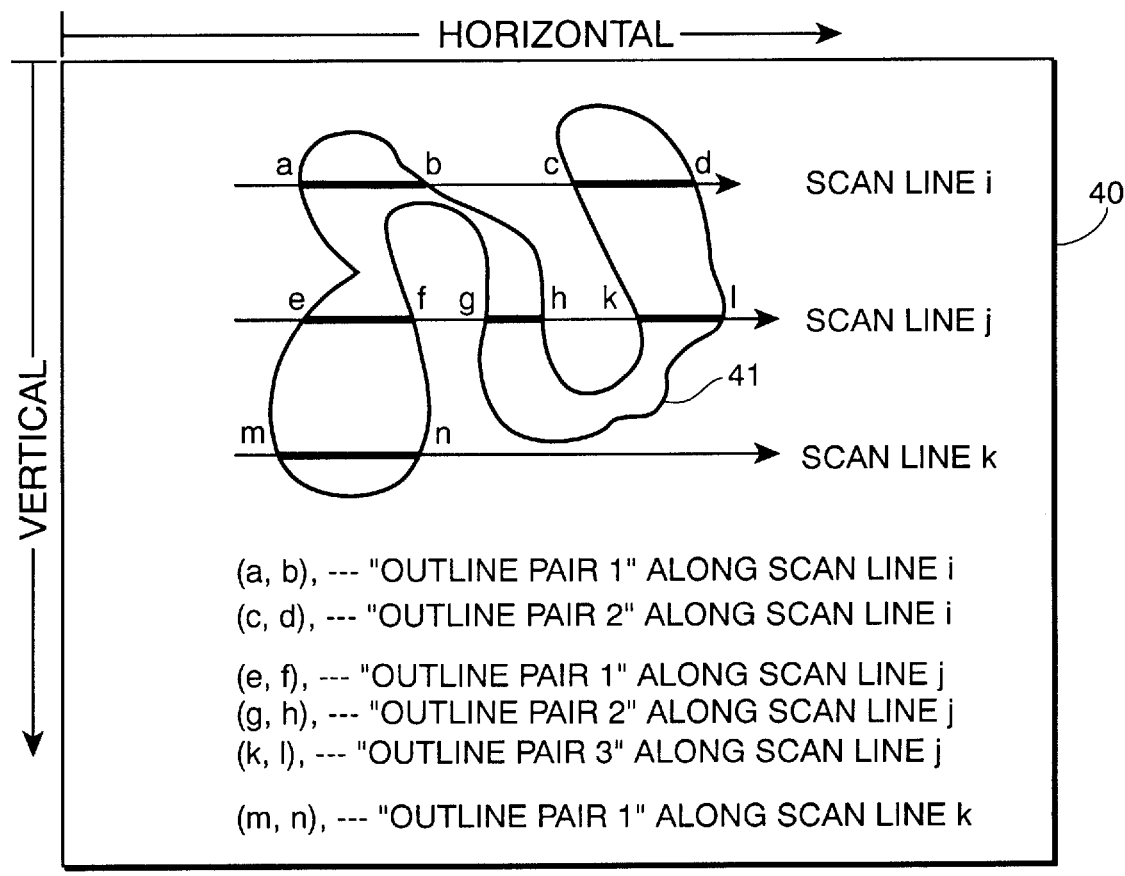
FIG. 6B is a view for explaining outline pairs.

FIG. 6A is a flow diagram showing a method for obtaining outline pairs for each rectangular block of image information, as described briefly above in connection with step S503 of FIG. 5, and FIG. 6B is a diagram for explaining what is meant by "outline pairs".

Briefly, referring to FIG. 6B, for an arbitrary block 40 of image data defined in block selection step S502 includes multiple scan lines in the vertical direction, each of the scan lines extending horizontally across the block. An arbitrarily shaped connected component 41, which, for example, may be an-image of a character or some other image, also extends vertically across multiple scan lines. "Outline pairs" are defined for each scan line which includes object 41. Each outline pair on a scan line (and there may be more than one outline pair on each scan line if the object intersects the scan line at different positions) includes exactly two points; a first (or left) point at which the object begins on the scan line, and a second (or right) point at which the object stops on the scan line. Thus, for example, referring to FIG. 6B, scan line i includes two outline pairs, a first comprising (a, b), and a second comprising (c, d). Outline pair (a, b) includes a first (or left) point a at which object 41 begins on scan line i and a second (or right) point b at which object stop 41 stops on scan line i. Likewise, outline pair (c, d) includes a first (or left) point c at which object 41 begins for a second time on scan line i, and a second (or right) point d on which the second occurrence of object 41 on scan line i stops. For scan line "j" there are three outline pairs, namely (e, f), (g, h), and (k, l); while for scan line "k", there is but one outline pair (m, n). The image inside and including the outline pairs is the image belonging to the connected component of object 41. Accordingly, an image of the object can be extracted based solely on the outline pairs along each scan line.

As will be appreciated from FIG. 6B, if each object in an image were represented by outline pairs, there would never be confusion as to which portion of an image needed to be extracted for subsequent image processing. On the other hand, considerable memory space is needed to store each outline pair in an image, particularly when an image is composed of text for which thousands of outline pairs would be needed. Moreover, use of outline pairs is inconvenient since it leads to non-intuitive representation of images which are more naturally presented to users in a block-rectangular format. Of course, block-rectangular format requires far less memory storage requirements, since merely the upper-left corner and lower-right corner need be defined for each rectangle. The above-noted drawback encountered when overlapping rectangles occur is addressed in part by proper use of outline pairs, as described in more detail below.

Referring to FIG. 6A, a flow diagram is shown for deriving outline pairs for each of three different kinds of blocks: a text block, a non-text block without internal components, and a non-text block with internal components. As will be appreciated, any block encountered in an image will fall into one of these three mutually exclusive categories. As further will be appreciated from FIG. 6A, outline pairs for each different kind of block are derived differently from how outline pairs are derived for other kinds of blocks.

Figure 7A:
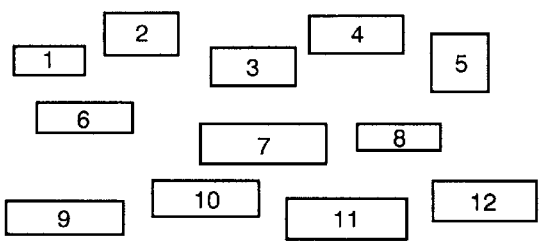
FIG. 7A through 7F are views for explaining how to obtain outline pairs for text-type image data.
Figure 7B:
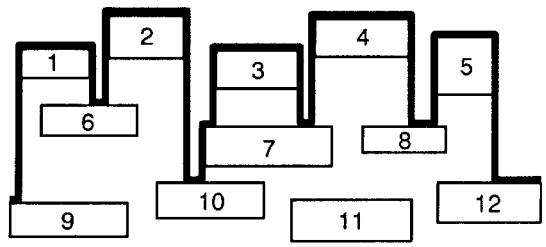
Figure 7C:
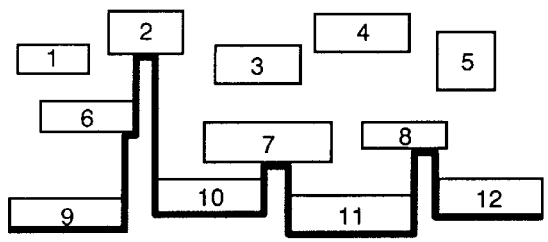
Figure 7D:
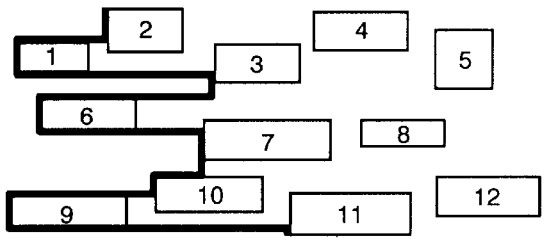
Figure 7E:
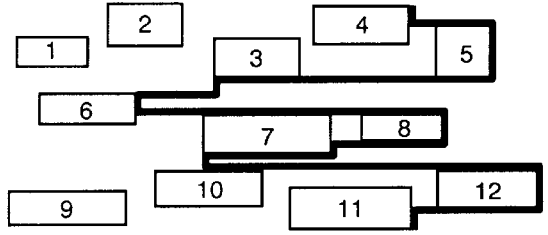
Figure 7F:
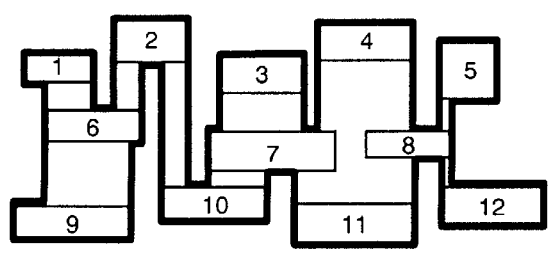

Thus, in step S601, a rectangular block derived in step S502 (of FIG. 5) is inspected to determine whether it is a text block. If it is a text block, then outline pairs are obtained in accordance with steps S602, S603 and S604 in which the top, bottom, left and right edges of connected components in the block are first obtained, those four edges are combined into a tight outline of all connected components within the block, and outline pairs are obtained from the tight outline. This processing is illustrated in connection with FIGS. 7A and 7P. Referring to FIG. 7A, a depiction of a rectangular block containing text connected components is shown. Twelve text connected components are shown, but this number is far less than would ordinarily be encountered and is shown merely for the sake of simplicity. In FIGS. 7B through 7E, and in accordance with step S602 of FIG. 6, a top edge, a bottom edge, a left edge and a right edge of all connected components are obtained, respectively. Then, in accordance with step S603 and as shown in FIG. 7F, the top, bottom, left and right edges are combined into a tight outline of all connected components. It will be appreciated that by combining the four edges, the tight outline forms into a closed loop which tightly surrounds all of the text in the text block. Finally, outline pairs are obtained (step S604) by obtaining outline pairs of the tight outline shown in FIG. 7F.

In steps S602 through S604, it is felt that use of rectangular boundaries of the connected component to form a tight outline to enclose the text block will yield good results without spending excessive amounts of time in calculating a tight outline based on each connected component. However, if this artificially made outline results in an overlap with another object's outline, the overlapping portion can be modified by using the outline pairs of each of the connected components which involve the overlap.

Figure 8:
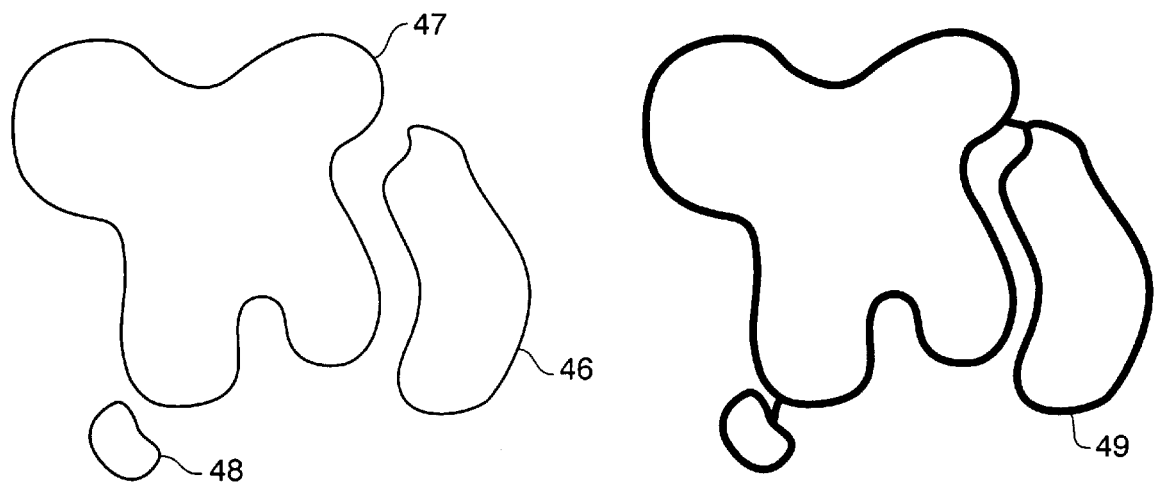
FIG. 8 is a view for explaining how to obtain outline pairs for non-text image data that does not include any internal components.

Reverting to FIG. 6, if step S601 determines that the rectangular block is not a text block, then flow advances to step S605 to determine whether the rectangular block is a non-text block without any internal components. If the rectangular block is a non-text block without any internal components, then flow switches to steps S606 and S607 in which outline pairs are obtained for each connected component within the block, and the outline pairs so obtained are connected. This processing is shown in FIG. 8 in which three arbitrary connected components, 46, 47 and 48, are shown. Outline pairs are derived for each of the connected components, and it is considered whether or not to connect and combine the outline pairs so as to form a single outline which encloses the entire non-text block, as indicated generally at 49. If connection is desired, as shown at 49, then an empty route for the connection must be found, i.e., a route which will not cause an overlap, whereafter the connected outline is then output as the outline pairs. On the other hand, if no connection is desired, then the outline pairs of each separate connected component are output.

Reverting to FIG. 6, if step S605 did not determine that the rectangular block was a non-text block without internal components, then since the categories are mutually exclusive the rectangular block must necessarily be a non-text block with internal components. Accordingly, flow advances to steps S609 and S610 (step S608 is shown merely for completeness and need not actually be executed). In steps S609 and S610, not only outline pairs of the outer outline of the non-text object are obtained, but also outline pairs of interior white contours are obtained so as to assist in extracting the internal components of the block.

Figure 9A:
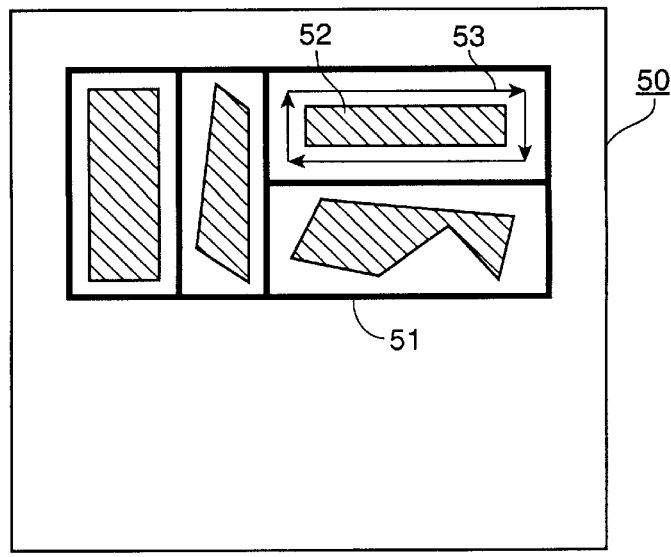
FIGS. 9A and 9B are views for explaining how to obtain outline pairs for non-text image data that includes internal components.

More specifically, and referring to FIG. 9A, non-text components with internal components, such as frame objects, table objects or line drawing objects, may have white contours contained inside the outer-most outline of the object. Internal white contours are used so as to assist in extracting the internal objects. Thus, as shown in FIG. 9A, and as explained at step S609, for an arbitrary non-text block 50 which includes internal components 52 such as text components, outline pairs are first obtained for the connected component which defines the outer-most outline of the non-text object. Accordingly, in the circumstances shown in FIG. 9A, outline pairs are obtained for connected component 51 Thereafter, and in accordance with step S610, outline pairs are obtained for internal white contours of the outer-most outline. One such internal white contour is shown at 53. (A detailed description of how to obtain internal white contours is explained in Application No. 07/873,012, the contents of which have been incorporated herein by reference as mentioned above.) Outline pairs for both the connected component which defines the outer-most outline and for the internal white contours are then output as the needed outline pair information.

Figure 9B:
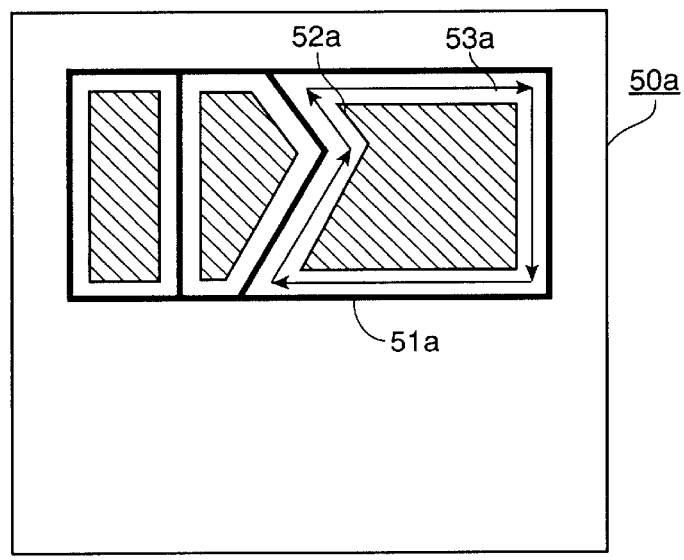
Figure 9C:
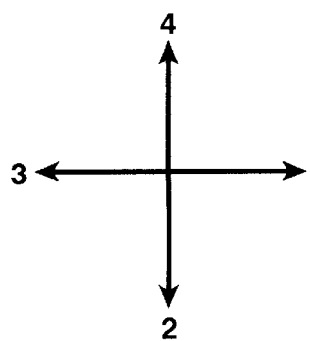
FIGS. 9C and 9D are views for explaining the difference between 4-directional and 8-directional white contour tracing.
Figure 9D:
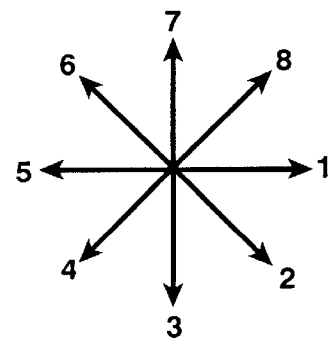

While Application No. 07/873,012 describes derivation of internal white contours in the 4-directional pattern shown in FIG. 9C, it is possible also to derive internal white contours in the 8-directional pattern shown in FIG. 9D. 8-directional derivation is advantageous for situations such as is shown in FIG. 9B where the non-text outermost outline does not have only perpendicularly-arranged sides, but rather also includes oblique sides. Of course, the 8-directional pattern can be used for the situation pattern shown in FIG. 9A, as well. 8-directional derivation permits good definition of internal white contours, such as is shown at 53a, even where oblique sides are present. However, if the 8-directional search pattern is applied, in each search step, the white contour tracing should be reviewed to determine if it is completely wrapped by an outer black boundary.

In summary, FIG. 6 shows the detailed processing that was referred briefly to in step S503 by which outline pairs are obtained for each rectangular block identified by block selection, and by which outline pairs are obtained differently in dependence upon whether the block is a text block, a non-text block without internal components, or a non-text block with internal components.

FIGS. 10 and 11A through 11C are views for explaining process steps S504 and S505 of FIG. 5 which determine whether any circumscribing rectangles overlap, and if there are overlapping rectangles, whether the overlap affects image extraction.

Figure 10:
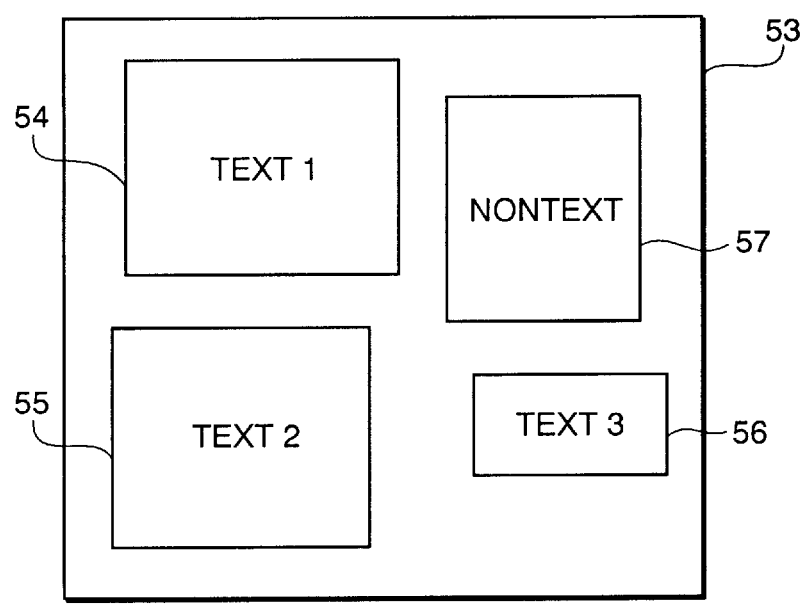
FIG. 10 is a view for showing circumscribing rectangles which do not overlap.

Specifically, step S505 determines whether or not any blocks identified by block selection overlap. Such overlap can be determined by comparing the two coordinates which define each block (namely, the upper-left corner and the lower-right corner) with the corresponding coordinates for each of the other blocks. Thus, FIG. 10 shows an image 53 for an arbitrary document which includes four blocks, namely text block 54, text block 55, text block 56, and non-text block 97. Comparison of the upper-left corner and lower-right corner for each block with the corresponding coordinates for the other blocks indicates that there are no overlapping blocks for document 53. Accordingly, no decomposition is needed for the blocks in image 53, and processing for document 53 can proceed directly to extraction of image data (step S509).

Figure 11A:
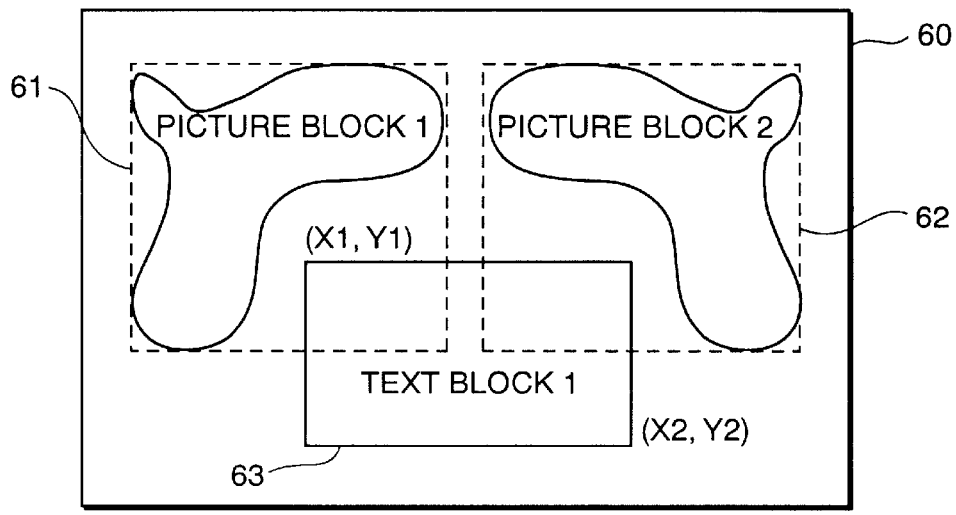
FIGS. 11A through 11C are views for explaining analysis to determine whether overlapping rectangles affect image extraction.
Figure 11B:
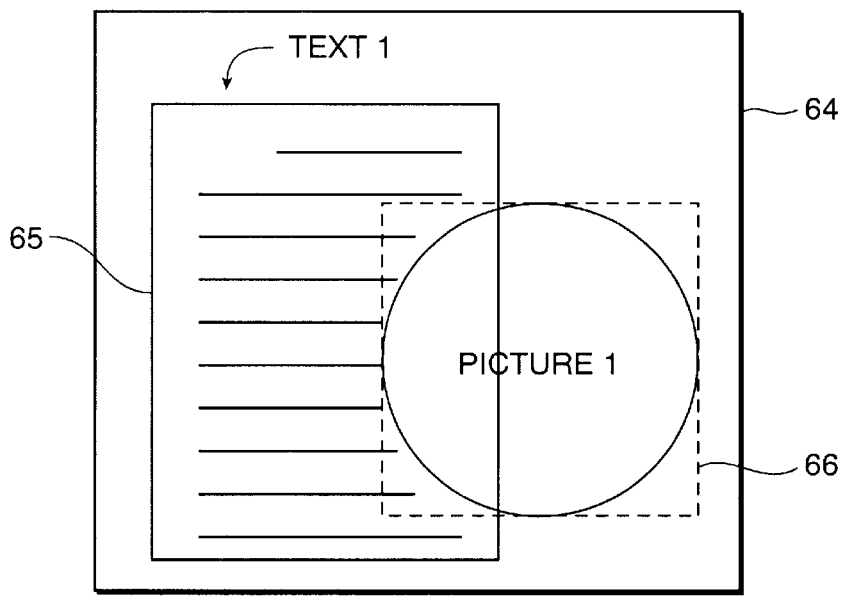
Figure 11C:
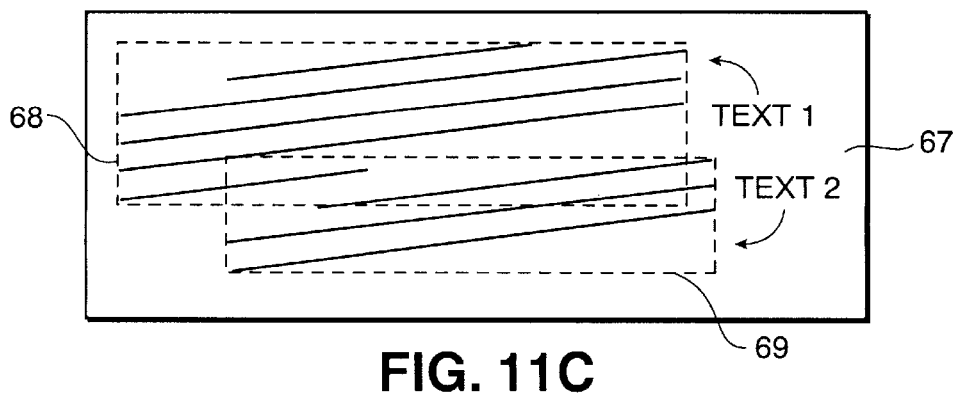

FIGS. 11A through 11C are views for explaining whether overlaps in rectangular blocks affect image extraction. Thus, in FIG. 11A, an image 60 of an arbitrary document contains three blocks, namely picture block 61, picture block 62, and text block 63. By comparison of upper left-corner and lower-right corner coordinates (i.e., coordinates $(x_1, y_1)$ and $(x_2, y_2)$) of text block 63, it is determined that text block 63 overlaps onto non-text block 61 and onto non-text block 62. In the circumstances of FIG. 11A, however, even though text block 63 overlaps onto blocks 61 and 62, no image data from blocks 61 and 62 is present in the area where text block 63 overlaps onto them. Thus, in spite of the overlap, image extraction for block 63 will not be affected, and no decomposition is needed for text block 63. On the other hand, image extraction for non-text blocks 61 and 62 will both be affected by overlap. Specifically, when extracting image data based on rectangular coordinates of block 61, not only will the needed picture data be extracted, but also portions of unwanted text data, from block 63, will also be extracted. Accordingly, for both of non-text blocks 61 and 62, block decomposition is needed in accordance with steps S506, S507 or S508, as appropriate. (Here, assuming that non-text blocks 61 and 62 do not contain internal components, then decomposition processing would be conducted in accordance with step S507.)

FIG. 11B shows another situation in which, for an arbitrary image 64 which contains text block 65 and non-text block 66, an overlap exists between blocks 65 and 66. In this situation, and unlike the situation in FIG. 11A, because of the overlap it is not possible to extract image information for either block 65 or 66 without also obtaining unwanted image data for the other block. Accordingly, both blocks 65 and 66 are subjected to decomposition in accordance with steps S506 through S508.

Overlaps shown in FIGS. 11A and 11B were due to editing styles and came about because of indentation and positioning of graphics mixed together on a single page with text. Overlaps can be due to other causes, however, and therefore should not be limited strictly to overlaps due to editing styles. For example, it is possible for an overlap to be caused by skew in image data, and skew can either be intentional (again an editing style) or unintentional due to scanning a document at an angle. This situation is shown in FIG. 11C in which an arbitrary document 67 includes a first text block 68 and a second text block 69. Both text blocks are skewed, and because of the skew an overlap is formed between blocks 68 and 69. Because of the overlap, image information from one block cannot be extracted without also extracting unwanted information from another block. Accordingly, decomposition of both blocks 68 and 69 is needed.

[Decomposition Of An Overlapping Text Block]

In order to properly extract text which falls within a rectangle which overlaps another text block or block of another image type, a text block containing the text to be extracted is decomposed into smaller non-overlapping rectangles. The process of decomposing an overlapping text block discussed above with respect to step S506 will be discussed in greater detail below with respect to FIGS. 12A–12I, 13A–13B, 14A–14C and 15A–15B.

Once it has been determined that an overlapping text block area exists and it is determined the overlapping text block area affects image extraction, the way in which the overlapping condition exists is examined in order to determine which areas are to be readily decomposed (non-overlapping areas) and which area requires further decomposition (the overlapping area). As shown in FIGS. 12A–12I, there are nine (9) examples of how an overlapping may occur between two blocks. (Mirror-images and rotations of these nine examples may exist.) For example, if two rectangles have some overlap, their horizontal and vertical sides may overlap fully, partially, or either side of one rectangle may be fully within that of another rectangle, such as the overlapping condition illustrated in FIG. 12D.

Figure 12C:
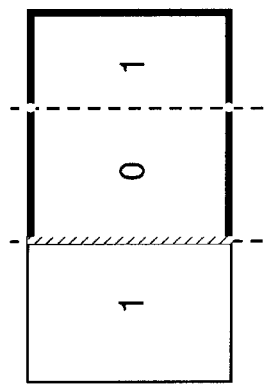
FIGS. 12A through 12I are views for explaining how two blocks can overlap.
Figure 12F:
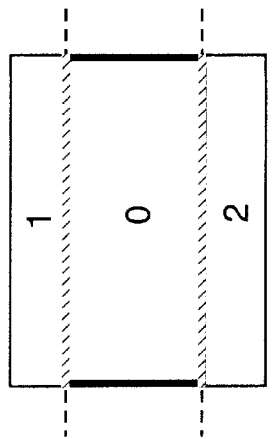
Figure 12I:
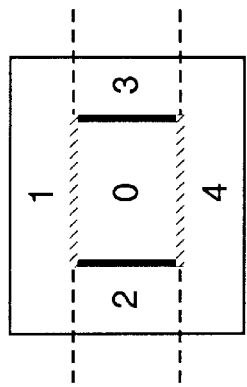
Figure 12B:
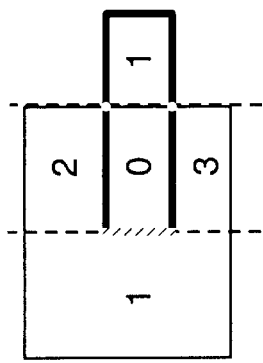
Figure 12E:
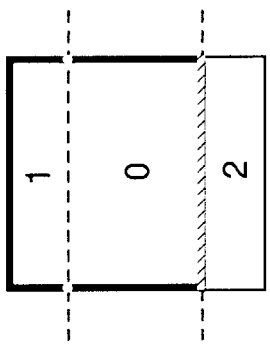
Figure 12H:
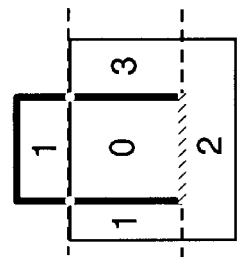
Figure 12A:
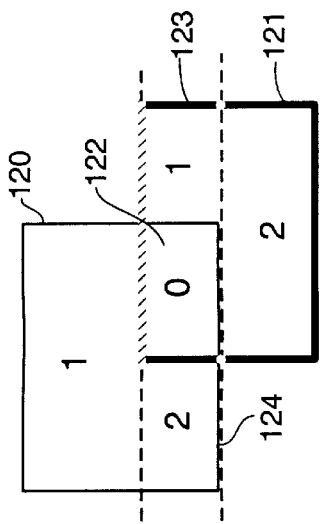
Figure 12D:
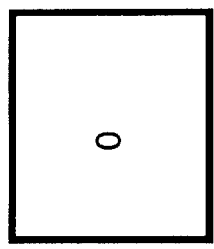
Figure 12G:
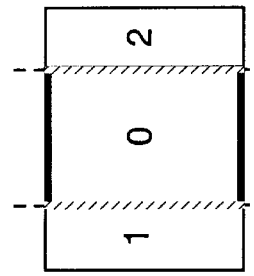

The areas which do not involve an overlapping area can be readily decomposed into at least two and at most four rectangles as illustrated in each overlapping condition in FIGS. 12A–12C and 12E–12I. Of course, there are times when two blocks completely overlap each other as illustrated in FIG. 12D. The first step of decomposition is to trim away areas which are not overlapped by decomposing those areas into one or more non-overlapping rectangles. As shown in FIGS. 12A–12C and 12E–12I, the non-overlapping areas are illustrated in non-bolded outlines. For example, as shown in FIG. 12A, text block 120 can be decomposed into a first and second area which are not overlapped and text block 121 can be decomposed into a first and a second area which are not overlapped with text block 120. The result is four non-overlapping areas which can be readily decomposed. However, for overlapping area 122, a further decomposition step is required. This process will be discussed below in greater detail.

Initially, for the purposes of clarity, a text block to be decomposed will be referred to as a "text block" and the object or a non-text area which a rectangular area of the text block overlaps will be referred to as the "overlapped object". The overlapped object in this case could be a text block, non-text block, or an already decomposed rectangle. If the overlapped object is a decomposed rectangle, an initial decomposition process should be sufficient to decompose the text block. If the overlapped block is a text or a non-text block, a second step of decomposition will be required using the "outline pairs" of the text or non-text block.

Figure 13A:
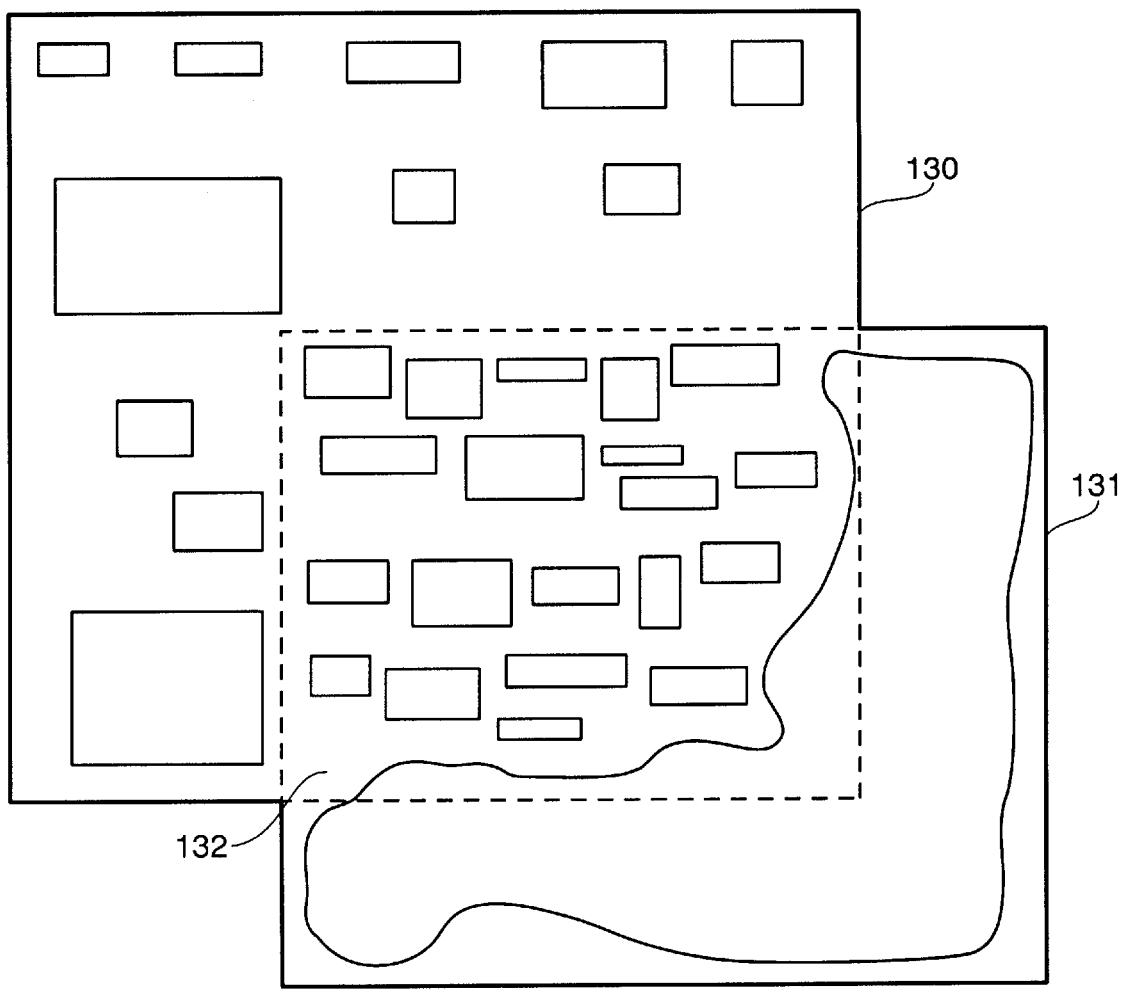
FIG. 13A is an example of a text block overlapping a non-text block.
Figure 13B:
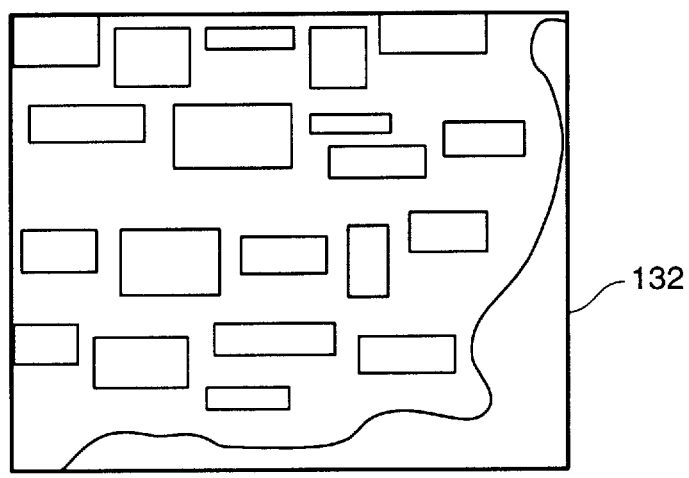
FIG. 13B is a trimmed out overlapping area shown in FIG. 13A.

Now referring to FIG. 13A, there is an example of a text block 130 which overlaps non-text block 131. Like the overlapping condition noted in FIG. 12A, the text to be extracted exists within overlapping area 132 and once the non-overlapping blocks are decomposed, overlapped area 132 results as shown in FIG. 13B. Overlapping area 132 is then subjected to further decomposition in order to create smaller non-overlapping rectangles so that text blocks can be readily extracted from the overlapping area.

Figure 14A:
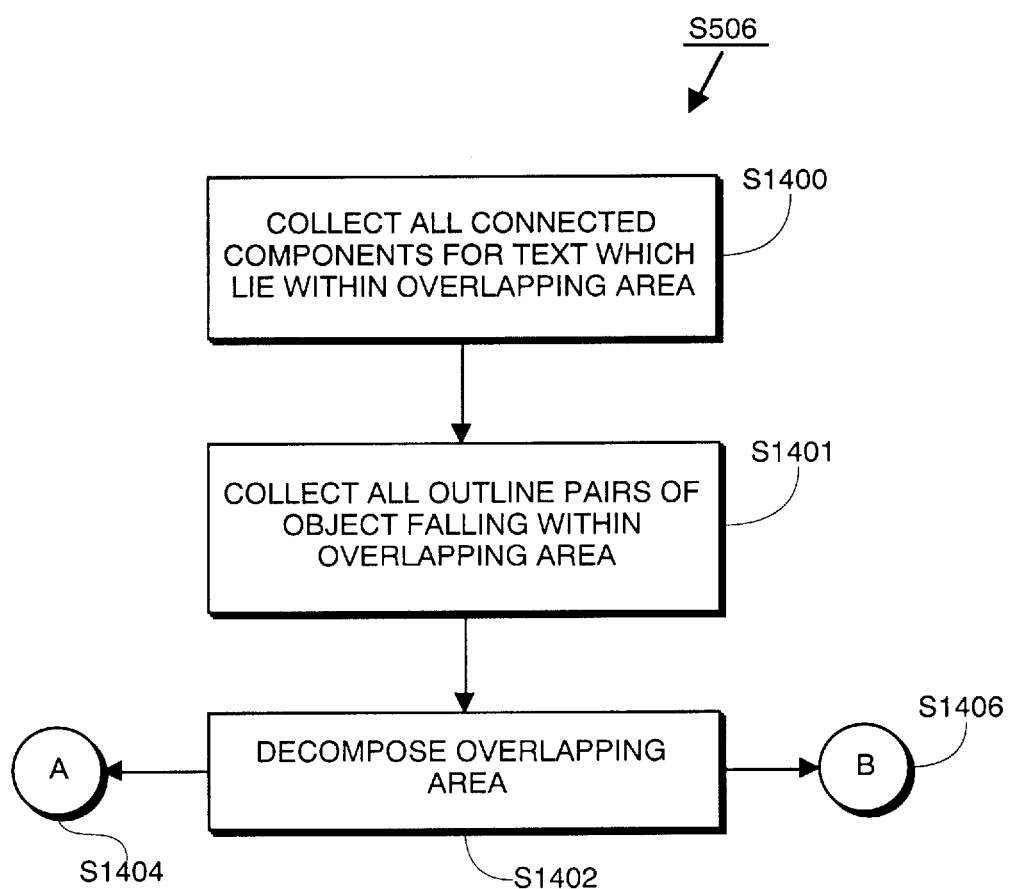
FIGS. 14A through 14C are flow diagrams showing how an overlapping text block is decomposed into smaller rectangles.

Thus, the process of further decomposing overlapping area 132 will be discussed with respect to the flowcharts illustrated in FIGS. 14A–14C. In step S1400, all connected components of the text blocks within area 132 are collected. Once they have been collected, the rectangles are trimmed for each component to fit into the overlapping area as shown in FIG. 15A. For example, as shown in FIG. 15A, block 151 has been trimmed so that only the part of the block within the overlapping area remains. That is, what is shown in FIG. 15A of block 151 is only a portion of an entire block. The same is true for block 152 as well as the remaining portion of non-text image 153.

In step S1401, all outline pairs of the overlapped non-text object falling within the overlapping area 132 are collected and, as discussed above, the non-overlapping portion is trimmed from the overlapped portion. In step S1402, connected components are grouped into sets of rectangles which do not fall within the overlapped non-text image. In this regard, the process of grouping connected components into sets of non-overlapping rectangles in step S1402 can be performed by two different methods, method A and method B. In method A, trimmed connected components of text blocks within area 132 are used in step S1404 and, in method B, outline pairs derived from the trimmed connected components of the overlapped text blocks are used. In either method A or method B, the text block is further decomposed into rectangles which do not overlap the non-text image.

Thus, using method A decomposition, in step S1405, it is determined if the text block is a horizontal text block. If it is determined in step S1405 that it is a horizontal text block, flow proceeds to step S1407 in which all connected components along the horizontal direction are grouped together. Once all of the connected components along the horizontal direction are grouped, flow proceeds to step S1408 at which point all connected components along the vertical direction are grouped together.

In step S1409, it is determined if any remaining connected components in the overlapping area which do not overlap with any of the outlined pairs of the overlapped non-text object exist. If no further connected components which do not overlap the outline pairs exist, in step S1412, the grouping procedure is terminated. The grouped horizontal connected components and the grouped vertical connected components are then combined to form four (4) non-overlapping rectangles 154, 155, 156 and 157. The coordinates of these rectangles are used to extract the text from the overlapping area in the same manner as text in any non-overlapping areas. However, in a case that there exists more connected components, flow returns to step S1407.

In step S1405, if the text block is not a horizontal text block, then flow proceeds to step S1414 in which the connected components are first connected along the vertical direction. Once they have all been connected along the vertical direction, flow proceeds to step S1415 at which time all the connected components are grouped together along the horizontal direction. As in step S1409, in step S1416, it is determined if there are any remaining components which do not overlap any of the outlined pairs of the overlapped non-text image. If it is determined that there are no remaining connected components which do not overlap with any of the outline pairs of the overlapped objected, then the grouping procedure terminates in step S1412. The grouped horizontal connected components and the grouped vertical connected components are then combined to form non-overlapping rectangles. The coordinates of these rectangles are stored and used to extract the text from the overlapping area in the same manner as text in any non-overlapping areas. If there exists connected components which do not overlap, flow returns to step S1414.

Figure 14B:
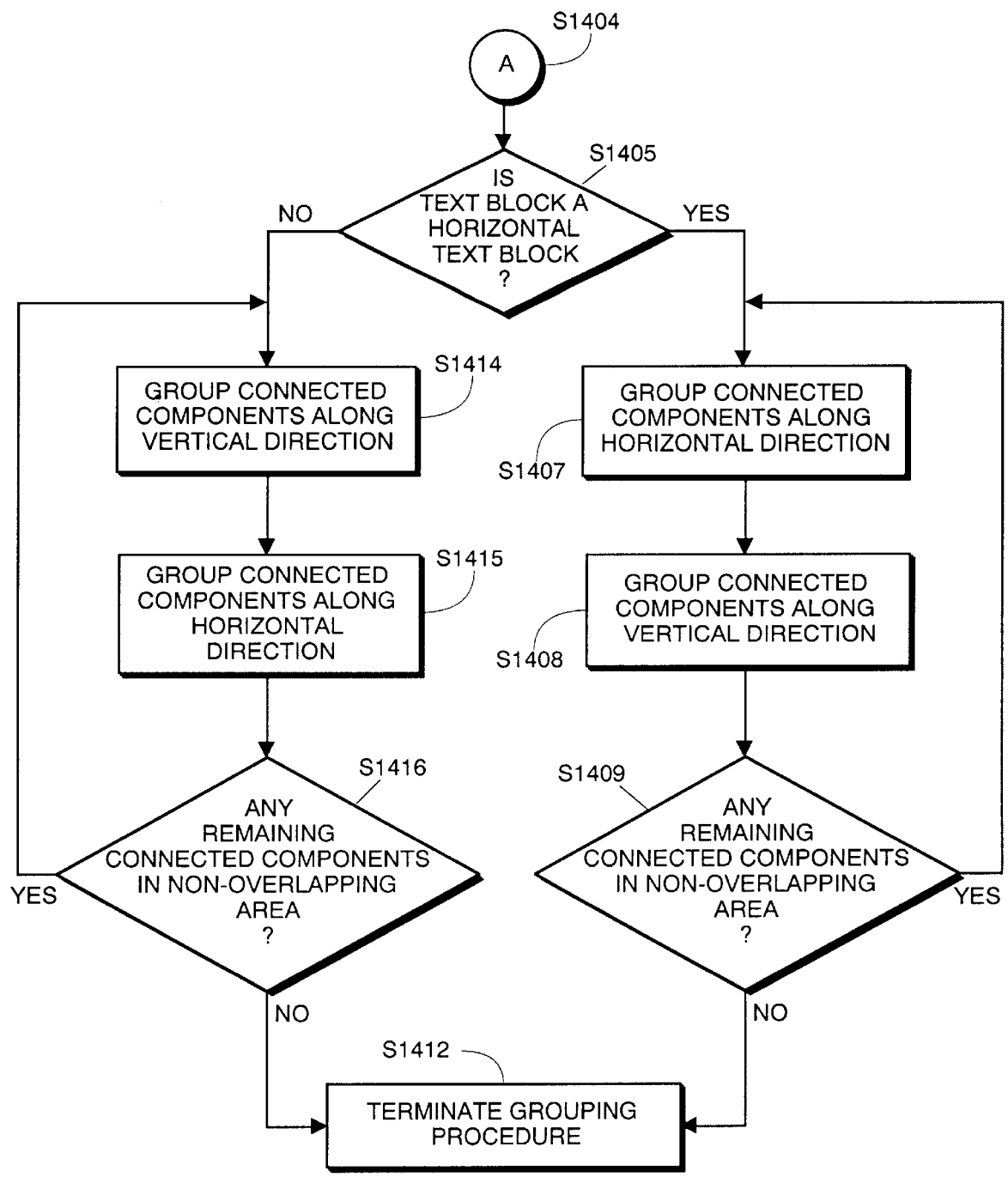
Figure 14C:
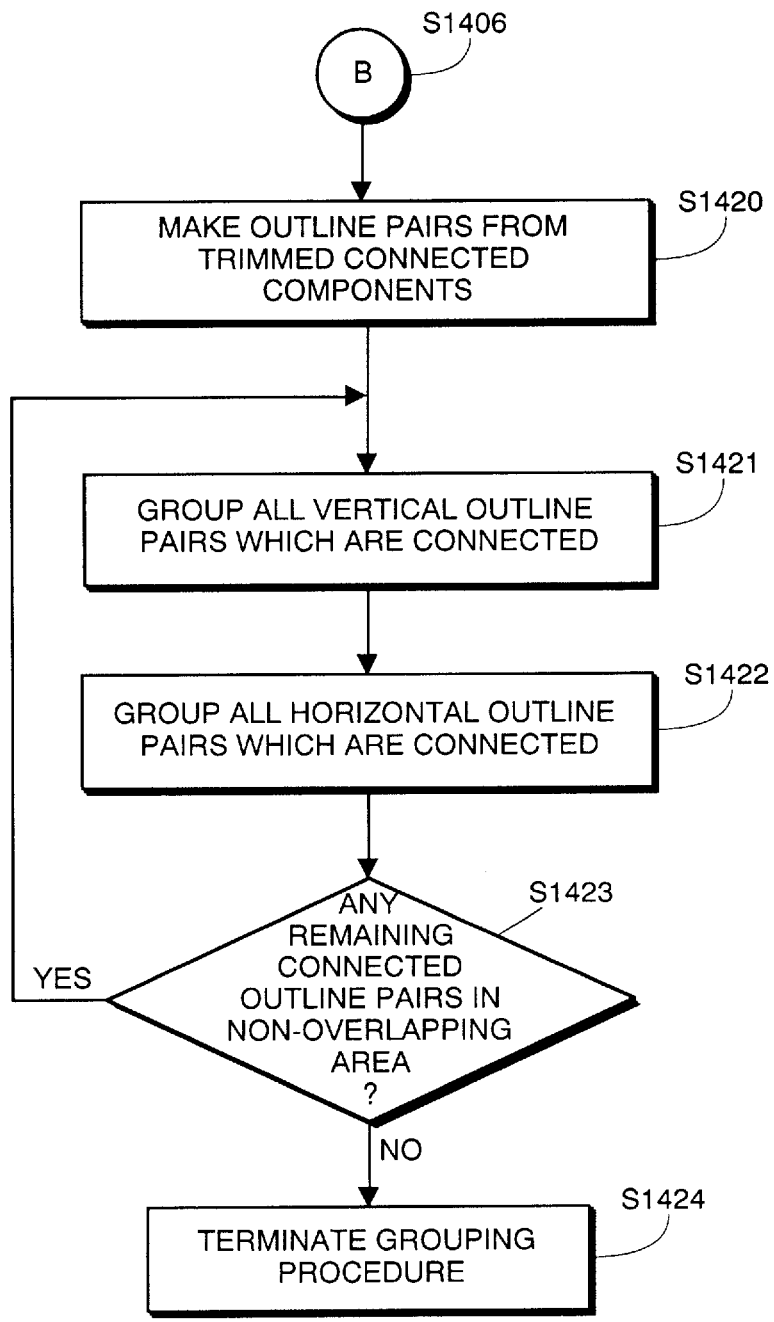
Figure 15A:
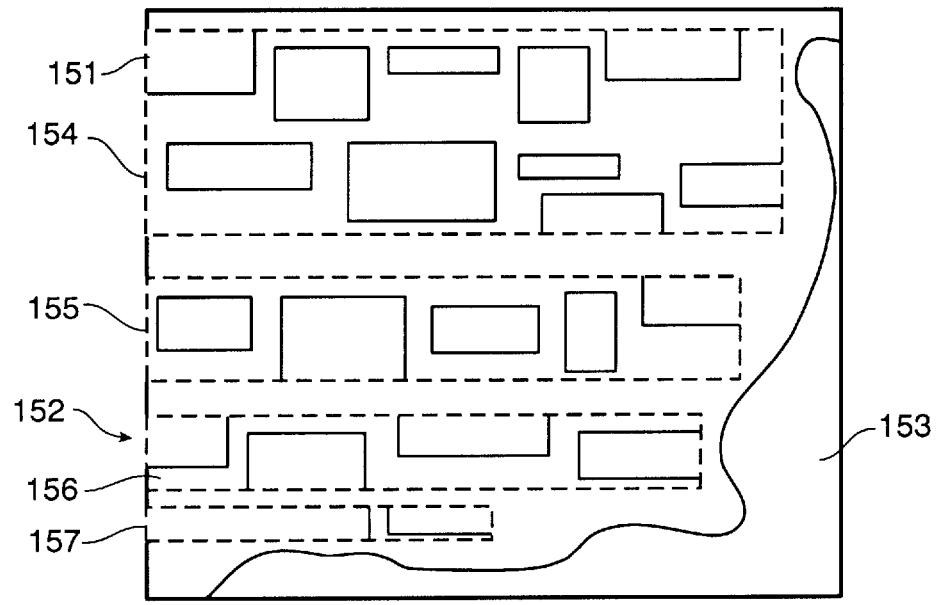
FIGS. 15A and 15B are views for explaining the two methods for decomposing an overlapping text block area.

The result of grouping the connected components in FIG. 14B results in blocked areas which now can be extracted for further processing. The further decomposition now permits text data within the overlapping area to be readily extracted for proper post-processing.

Figure 15B:
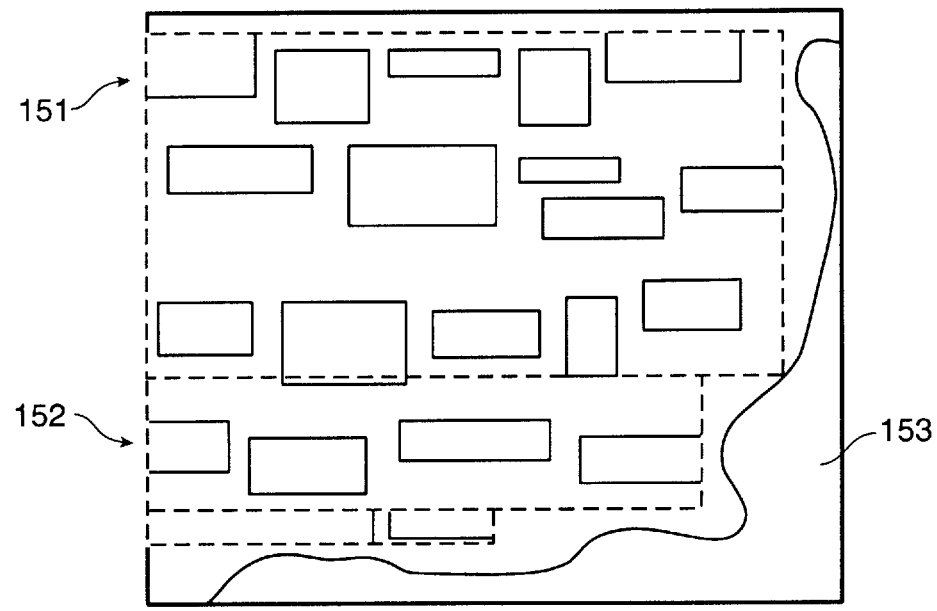

On the other hand, if process B is used (step S1406) in step S1420, outline pairs are derived from collected connected components or the outline pairs of the text block are trimmed to fit into the overlapping area as shown in FIG. 15B. It is noted that the grouping is somewhat different than that shown in FIG. 15A since the grouping is now produced by outlines pairs as opposed to connected components of the text block. Once the outlines pairs have been derived from the trimmed connected components, flow proceeds to step S1421. In step S1421, all vertical outline pairs which are connected are grouped together. In step S1422, once all of the vertical outlines pairs which are connected are grouped along the vertical direction, the horizontal outlines pairs are then grouped together. In step S1423, it is determined if any remaining connected outline pairs in either the vertical or horizontal direction exist such that a rectangle produced from the vertical and horizontal group outline pairs do not overlap with any of the outline pairs of the overlapped object. If, in step S1423, it is determined that there exists no remaining connected outlines pairs, the grouping procedure is terminated in step S1424. The grouped outline pairs both in the vertical and horizontal direction are decomposed into rectangles which do not overlap with any of the outlines pairs of the overlapped object or with any of the non-grouped outline pairs of previously decomposed rectangles.

As a result of the foregoing process, text in an overlapped text block can be extracted by further decomposing an overlapping area of the text block into smaller non-overlapping rectangles.

[Decomposition Of A Non-Text Block Without Internal Contents]

The process of decomposing overlapping non-text blocks which do not include internal contents as discussed above with respect to step S507 will be discussed below in greater detail with respect to FIGS. 16A–16C and 17.

In the case that a rectangular area of a non-text block overlaps with that of another non-text block, it is possible to decompose one of the non-text blocks into a set of smaller non-overlapping rectangles. Based on the information provided by the set of smaller non-overlapping rectangles, it is possible to readily extract the overlapping non-text image from within the block.

For the purposes of clarity, the non-text block to be decomposed will be referred to as the "non-text block" and the area which is overlapped by the non-text block will be referred to as the "overlapped object".

Figure 16A:
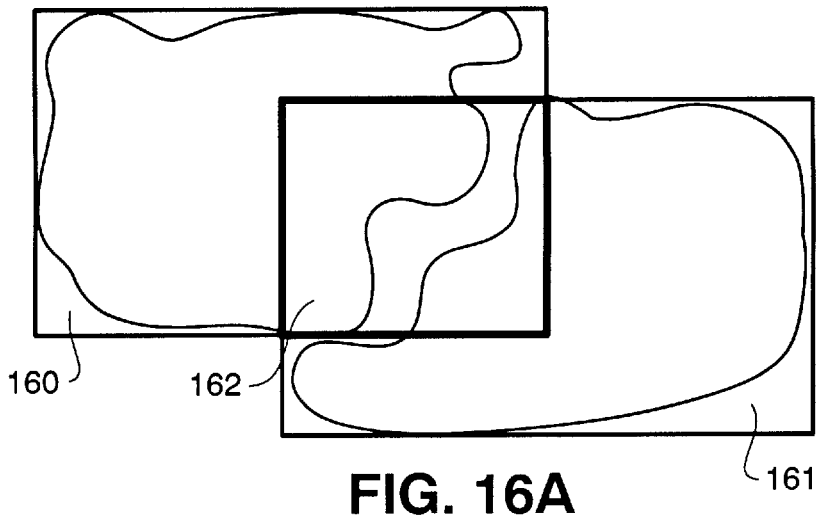
FIGS. 16A through 16C are views for explaining two overlapping non-text blocks.

Now referring to FIG. 16A, non-text image blocks 160 and 161 overlap in area 162. As discussed above with respect to the overlapping text block, the non-overlapping area is readily decomposed into a maximum of four non-overlapping rectangles. Based on "outlines pairs" of non-text blocks 160 and 161, it is possible to build a set of smaller non-overlapping rectangles within overlapping area 162, non-text blocks 160 and 161 utilizing the process illustrated in the flowchart of FIG. 17.

Thus, in step S1700, using outlines pairs of both non-text block 160 and overlapped object 161, non-overlapping areas are trimmed away so that only the image which falls within area 162 remains. That is, as discussed previously with respect to FIGS. 12A, rectangles 120 and 121, are trimmed away from overlapping area 122. Similarly, blocks 123 and 124 are trimmed away leaving only the overlapping area.

Figure 16B:
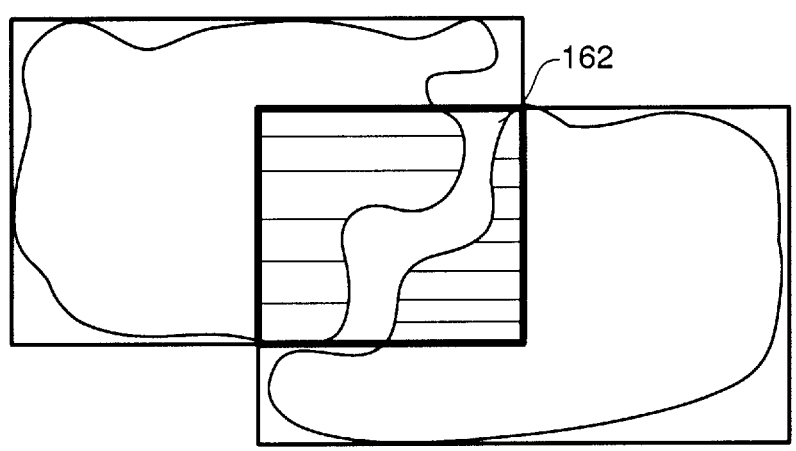
Figure 16C:
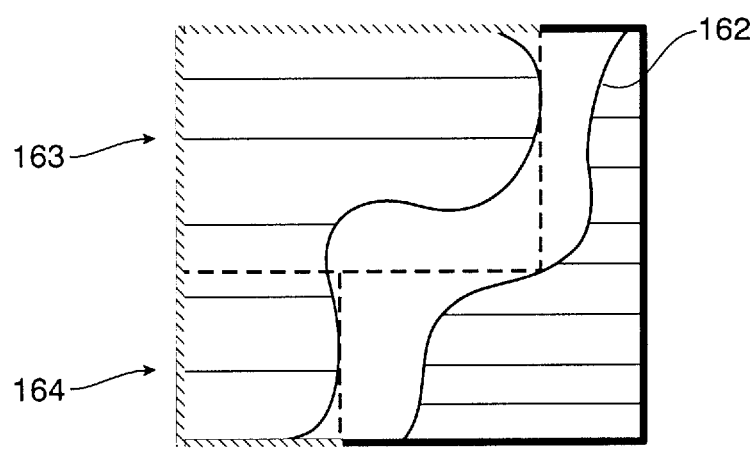
Figure 17:
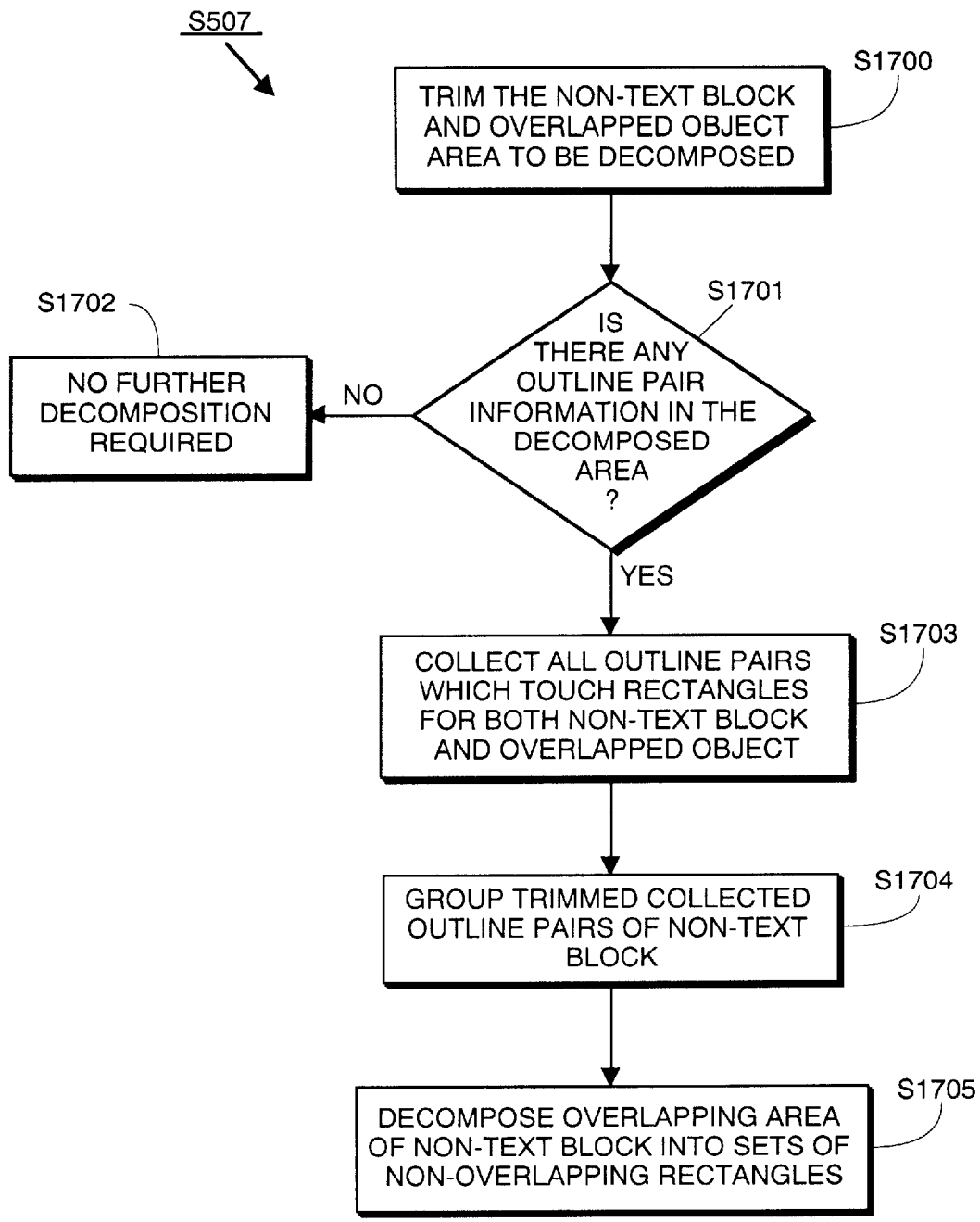
FIG. 17 is a flow diagram showing how an overlapping non-text image is decomposed.

As shown in FIG. 16C, the overlapping non-text blocks have been trimmed and decomposed. In step S1701, it is determined if there is any outline pair information in overlapping area 162. If it is determined that no outline pair information exists within the overlapping area in step S1702, no further decomposition is required and the process terminates. However, if it is determined that outline pair information exists in overlapping area 162, flow proceeds to step S1703.

In step S1703, all outlines pairs which touch the rectangular overlapping area (the boundary area of the overlapping area) are collected for both the non-text block and the overlapped object. Those collected outlines pairs are trimmed to fit within the overlapping area as shown in FIG. 16B.

In step S1704, the trimmed outlines pairs of non-text block 160 are then collected in step S1704. In step S1705, overlapping area 162 of non-text block 160 and overlapped block 161 are decomposed by grouping connected vertical outlines pairs and then by grouping horizontal outline pairs after the grouping along the vertical direction ends. Once the vertical outlines pairs are grouped and the horizontal outline pairs are grouped, rectangles are formed so as not to overlap any of outline pairs of overlapped object 161. The result of decomposing overlapping area 162 of non-text block 160 is shown in FIG. 16C.

As shown in FIG. 16C, overlapping area 162 of non-text block 160 has been decomposed into two smaller non-overlapping rectangles 163 and 164.

[Decomposition Of A Non-Text Block With Internal Contents]

The process of decomposing non-text blocks which include internal contents, such as text, described above in step S508 will be discussed in greater detail with respect to FIGS. 18A–18D, FIG. 19 and FIGS. 20A–20B.

Initially, rectangular areas of some blocks, such as a frame, a table, or picture, may enclose different types of image data which is wrapped by white contours within the frame, table or picture. For example, in the case of flow diagrams, there is a non-text image (process box) which includes text (the action) within the non-text image and, therefore the image must be defined apart from the text so that either the image or text can be properly extracted without extracting the other.

In order to be able to properly extract a non-text image with or without contents, the non-text block with contents must be decomposed into a minimum number of smaller circumscribing rectangles which do not overlap the contents. From those smaller circumscribing rectangles, the blocked image, rather than the content image, can be properly extracted.

Figure 18A:
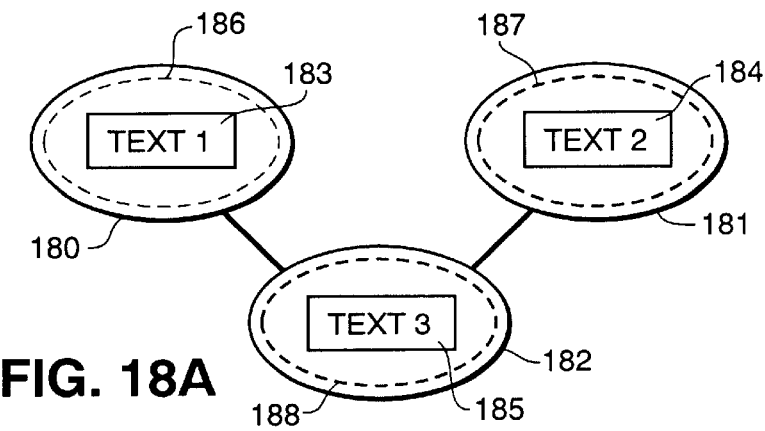
FIGS. 18A through 18D are views for explaining how non-text blocks which include internal contents are decomposed.

Referring now to FIG. 18A, there is an example of a non-text image which includes text contents. FIG. 18A shows an example of a flow diagram which includes non-text images 180–182, respectively. Inside each of non-text areas 180, 181 and 182 there are three white contour areas 186, 187 and 188, respectively, and within each white contour there is a text block 183, 184 and 185.

Figure 18B:
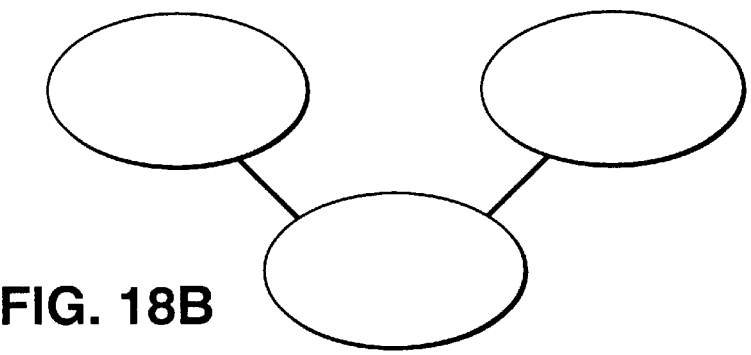

To obtain only the non-text image shown in FIG. 18B, outline pairs of the non-text image, white contour areas and text blocks are collected so that non-text images 180, 181 and 182 can be decomposed by smaller circumscribing rectangles.

Figure 19:
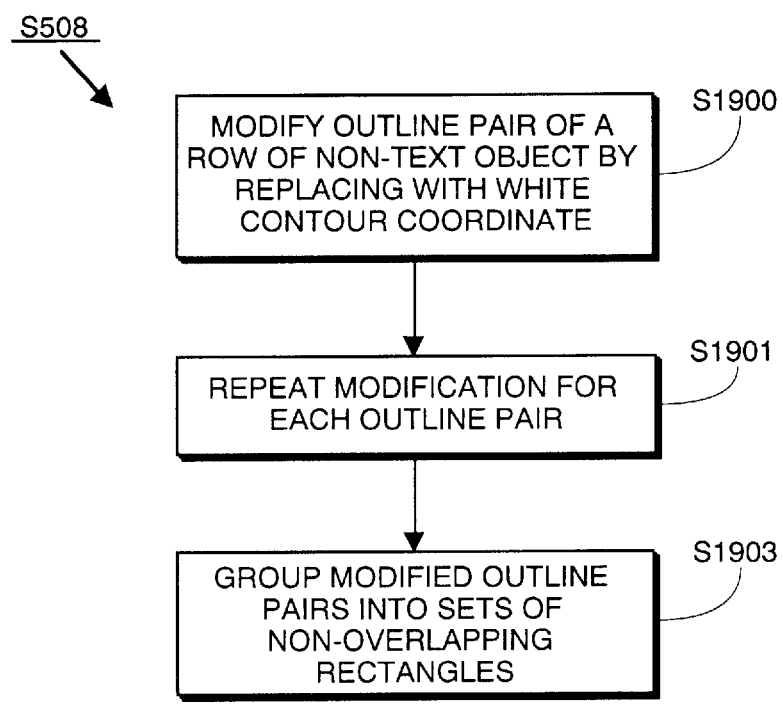
FIG. 19 is a flow diagram for explaining how a non-text block which includes internal contents is decomposed into smaller circumscribing rectangles.

Thus, in order to properly obtain the image shown in FIG. 18B, the following steps must be performed as illustrated in the flow diagram of FIG. 19.

Figure 18C:
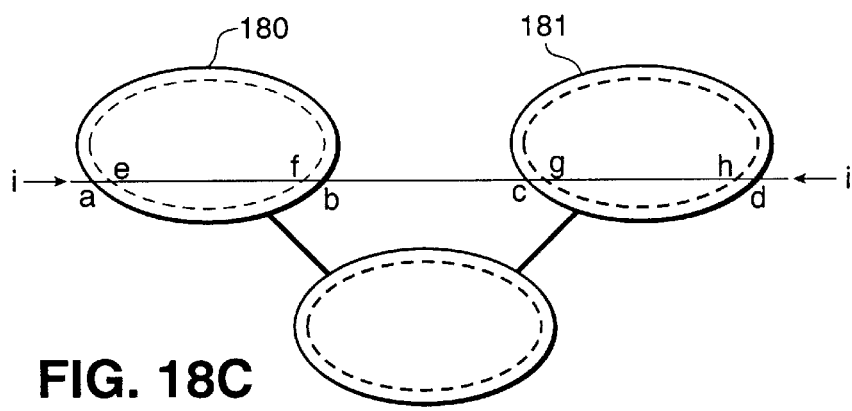

To begin decomposition of the image shown in FIG. 18A, outline pairs for each row of the non-text image are modified by replacing one of the outline pairs with an outline pair of the white contour. For example, as shown in FIG. 18C, the outline pairs of row i is modified by substituting the outline pairs of each row with a corresponding row of the white contour. That is, prior to modification, the outline pairs of the non-text image 180 and 181 are (a,b) and (c,d), respectively, and the outline pairs of the white contours of 186 and 187 are (e,f) and (g,h), respectively. Once the outline pairs have been modified by substituting the outline pairs of each row with a corresponding row of white contours, the outline pairs of the non-text image become (a,e), (f,b), (c,g) and (h,d).

Figure 18D:
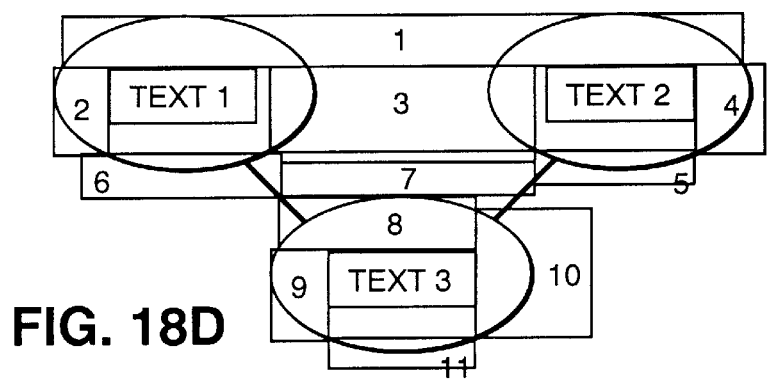

After modifying the outline pairs of each row, in step S1901, the modification is repeated for each outline pair of the non-text object. Once the modification of all rows of outline pairs is completed, in step S1903, the modified outline pairs are grouped into a set of circumscribing smaller rectangles from which a picture itself can be properly extracted. That is, in step S1903, a grouping process is performed by first grouping all of the vertically connected outline pairs, and then after grouping along the vertical direction ends, grouping all of the horizontally connected outlines pairs is performed. When no further modified outline pairs can be selected such that the overall circumscribing rectangle will not overlap any of the outline pairs of an internal block content, such as text blocks 183, 184 and 185, other not grouped outline pairs or other previously formed rectangles, the grouping procedure is terminated. Once all of the vertically connected outline pairs and the horizontally connected outline pairs have been connected, smaller circumscribing rectangles are created around non-text images 180, 181 and 182, the resulting decomposed image is shown in FIG. 18D. Thereafter, the coordinates of the rectangles are stored for further processing and decomposition ends.

As shown in FIG. 18D, the image of FIG. 18A has been decomposed into a minimum of 11 circumscribing rectangles. Utilizing the stored coordinates of these 11 circumscribing rectangles, the 11 rectangles, non-text images of 180, 181 and 182 can be properly extracted without extracting the contents therein.

Figure 20A:
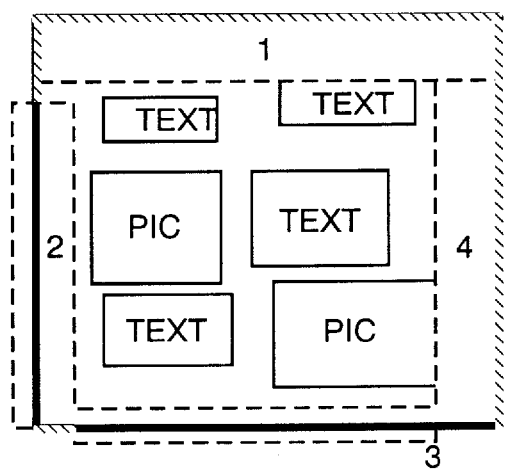
FIGS. 20A and 20B are views showing examples of a decomposed frame and a decomposed table, respectively.
Figure 20B:
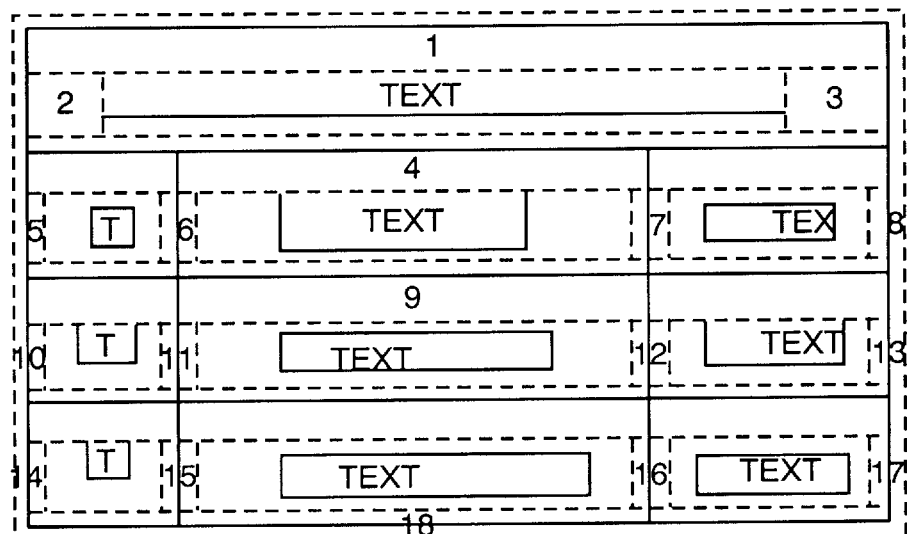

FIG. 20A is an example of how a frame image can be decomposed so as not to extract image data from blocks contained therein, such as the text and picture data. FIG. 20B shows an example of how a table can be decomposed using the above method such that the table image can be extracted without extracting the contents of the table.

Figure 21A:
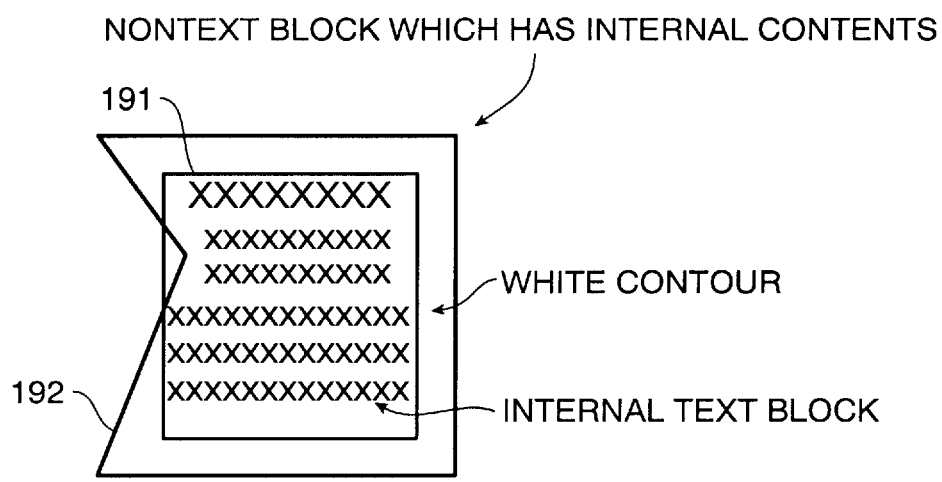
FIGS. 21A and 21B are views for explaining decomposition of text blocks contained in irregularly shaped outlines.
Figure 21B:
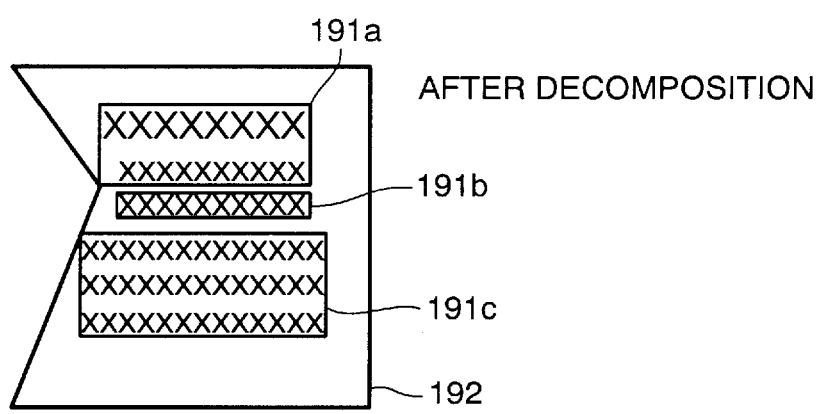

FIG. 21A illustrates a text block 191 contained within an irregularly-shaped outline 192. In such a situation, it is likely for the text block to overlap onto the block for the non-text outline. By virtue of the above-described decomposition, it is possible to decompose text block 191 into non-overlapping blocks 191*a*, 191*b* and 191*c,* all of which fall inside the white contour of outline 192, as shown in FIG. 21S. Such decomposition ensures that, when extracting image data for the text blocks, no unwanted image data for the outline is also erroneously extracted.

The invention has been described with respect to a particular embodiment. It is to be understood that the present invention is not limited to the above description, but may be applied to all types of image data to be extracted. In addition, if various changes and modifications may be made by those of ordinary skill in the art without departing from the spirit and scope of the invention.

What is claimed is:

1. An image processing method for processing image data which includes both text areas and non-text areas, comprising the steps of:

performing block selection to obtain circumscribing rectangles around each block of text type areas in the image data and around each block of non-text type areas in the image data;

obtaining, for each text and non-text block, an outline composed of outline pairs, the outline surrounding a plurality of connected components;

determining whether the circumscribing rectangles overlap;

decomposing overlapped rectangles into non-overlapping rectangles based on the circumscribing rectangles and the obtained outlines;

extracting image data based on the circumscribing rectangles for non-overlapped rectangles and based on the decomposed rectangles for overlapped rectangles; and processing the extracted image data.

2. An image processing method according to claim 1, wherein said step of performing block selection to obtain circumscribing rectangles includes the step of defining coordinates for upper-left and lower-right corners of each rectangle, and wherein said step of determining whether circumscribing rectangles overlap includes the step of comparing coordinates for one rectangle with coordinates for each of the other rectangles.

3. An image processing method according to claim 1, further comprising the step of determining whether overlapped rectangles affect image extraction, and wherein said step of decomposing overlapped rectangles is performed only when it is determined that overlap affects image extraction.

4. An image processing method according to claim 1, wherein said step of obtaining an outline for each block comprises the steps of determining which of plural mutually exclusive categories each block falls into, and obtaining outline pairs based on a selected one of mutually different outline pair techniques, the selected one being determined in accordance with which of the mutually exclusive categories the block falls into.

5. An image processing method according to claim 4, wherein the mutually exclusive categories consist of a text category, a non-text without internal component category, and a non-text with internal component category.

6. An image processing method according to claim 4, wherein in the case where the category for a block is a text-type category, outline pairs are obtained by tracing top, bottom, left and right edges of text connected components in the block, combining the top, bottom, left and right edges into a tight outline, and obtaining outline pairs from the tight outline.

7. An image processing method according to claim 4, wherein in a case where the category for a block is a non-text block without internal components, outline pairs are obtained by connecting outline pairs of each connected component in the block.

8. An image processing method according to claim 4, wherein in a case where the category for a block is a non-text block with internal components, outline pairs include outline pairs of interior white contours.

9. An image processing method according to claim 1, wherein said step of decomposing overlapped rectangles is comprised by the steps of determining which of plural mutually exclusive different categories the overlapped rectangle falls into, and decomposing the overlapped rectangle based on a selected one of plural different decomposition techniques, the selected one being selected based on which category the rectangle falls into.

10. A computer-readable memory medium storing computer-executable process steps to process image data which includes both text areas and non-text areas, the steps comprising:

a performing step to perform block selection to obtain circumscribing rectangles around each block of text type areas in the image data and around each block of non-text type areas in the image data;

an obtaining step to obtain, for each text and non-text block, an outline composed of outline pairs, the outline surrounding a plurality of connected components;

a determining step to determine whether the circumscribing rectangles overlap;

a decomposed step to decompose overlapped rectangles into non-overlapping rectangles based on the circumscribing rectangles and the obtained outlines;

an extracting step to extract image data based on the circumscribing rectangles for non-overlapped rectangles and based on the decomposed rectangles for overlapped rectangles; and a processing step to process the extracted image data.

11. A computer-readable memory medium storing computer-executable process steps according to claim 10, wherein said performing step includes a defining step to define coordinates for upper-left and lower-right corners of each rectangle, and wherein said determining step includes a comparing step to compare coordinates for one rectangle with coordinates for each of the other rectangles.

12. A computer-readable memory medium storing computer-executable process steps according to claim 10, further comprising a determining step to determine whether overlapped rectangles affect image extraction, and wherein said decomposing step to decompose overlapped rectangles is performed only in a case that it is determined that overlap affects image extraction.

13. A computer-readable memory medium storing computer-executable process steps according to claim 10, wherein said obtaining step to obtain an outline for each block comprises a determining step to determine which of plural mutually exclusive categories each block falls into, and an obtaining step to obtain outline pairs based on a selected one of mutually different outline pair techniques, the selected one being determined in accordance with which of the mutually exclusive categories the block falls into.

14. A computer-readable memory medium storing computer-executable process steps according to claim 13, wherein the mutually exclusive categories consist of a text category, a non-text without internal component category, and a non-text with internal component category.

15. A computer-readable memory medium storing computer-executable process steps according to claim 13, wherein in the case where the category for a block is a text-type category, outline pairs are obtained by tracing top, bottom, left and right edges of text connected components in the block, combining the top, bottom, left and right edges into a tight outline, and obtaining outline pairs from the tight outline.

16. A computer-readable memory medium storing computer-executable process steps according to claim 13, wherein in a case where the category for a block is a non-text block without internal components, outline pairs are obtained by connecting outline pairs of each connected component in the block.

17. A computer-readable memory medium storing computer-executable process steps according to claim 13, wherein in a case where the category for a block is a non-text block with internal components, outline pairs include outline pairs of interior white contours.

18. A computer-readable memory medium storing computer-executable process steps according to claim 10, wherein said decomposing step to decompose overlapped rectangles is comprised by a determining step to determine which of plural mutually exclusive different categories the overlapped rectangle falls into, and a decomposing step to decompose the overlapped rectangle based on a selected one of plural different decomposition techniques, the selected one being selected based on which category the rectangle falls into.

19. An image processing apparatus for processing image data which includes both text areas and non-text areas, comprising:

block selection means for performing block selection to obtain circumscribing rectangles around each block of text type areas in the image data and around each block of non-text type areas in the image data;

obtaining means for obtaining, for each text and non-text block, an outline composed of outline pairs, the outline surrounding a plurality of connected components;

determination means for determining whether the circumscribing rectangles overlap;

decomposition means for decomposing overlapped rectangles into non-overlapping rectangles based on the circumscribing rectangles and the obtained outlines;

extraction means for extracting image data based on the circumscribing rectangles for non-overlapped rectangles and based on the decomposed rectangles for overlapped rectangles; and process means for processing the extracted image data.

* * * * *

UNITED STATES PATENT AND TRADEMARK OFFICE
CERTIFICATE OF CORRECTION

PATENT NO. : 5,774,579

DATED : June 30, 1998

INVENTORS : SHIN-YWAN WANG, et al.

It is certified that error appears in the above-identified patent and that said Letters Patent is hereby corrected as shown below:

COLUMN 7

Line 42, "an-image" should read --an image--.

COLUMN 9

Line 33, "51" should read --51.--.

COLUMN 10

Line 11, "97." should read --57.--.

Signed and Sealed this

Twenty-sixth Day of January, 1999

Attest:

Attesting Officer

*Acting Commissioner of Patents and Trademarks*